(12) United States Patent
Kim et al.

(10) Patent No.: US 11,026,265 B2
(45) Date of Patent: Jun. 1, 2021

(54) METHOD AND DEVICE FOR EXECUTING RANDOM ACCESS IN WIRELESS CELLULAR COMMUNICATION SYSTEM

(71) Applicant: Samsung Electronics Co., Ltd., Gyeonggi-do (KR)

(72) Inventors: Taehyoung Kim, Gyeonggi-do (KR); Youngbum Kim, Seoul (KR); Cheolkyu Shin, Gyeonggi-do (KR); Hoondong Noh, Gyeonggi-do (KR); Younsun Kim, Gyeonggi-do (KR); Jeongho Yeo, Gyeonggi-do (KR); Jinyoung Oh, Seoul (KR); Seunghoon Choi, Gyeonggi-do (KR); Youngwoo Kwak, Gyeonggi-do (KR)

(73) Assignee: Samsung Electronics Co., Ltd

( * ) Notice: Subject to any disclaimer, the term of this patent is extended or adjusted under 35 U.S.C. 154(b) by 29 days.

(21) Appl. No.: 16/482,583

(22) PCT Filed: Jan. 18, 2018

(86) PCT No.: PCT/KR2018/000859
§ 371 (c)(1),
(2) Date: Jul. 31, 2019

(87) PCT Pub. No.: WO2018/147568
PCT Pub. Date: Aug. 16, 2018

(65) Prior Publication Data
US 2020/0015275 A1 Jan. 9, 2020

(30) Foreign Application Priority Data
Feb. 10, 2017 (KR) .................. 10-2017-0018901

(51) Int. Cl.
*H04W 76/11* (2018.01)
*H04W 74/08* (2009.01)
*H04W 74/00* (2009.01)

(52) U.S. Cl.
CPC ..... *H04W 74/0833* (2013.01); *H04W 74/004* (2013.01); *H04W 74/006* (2013.01); *H04W 76/11* (2018.02)

(58) Field of Classification Search
CPC ............ H04W 74/0833; H04W 76/11; H04W 74/004; H04W 74/006; H04W 56/00; H04J 11/00
See application file for complete search history.

(56) References Cited

U.S. PATENT DOCUMENTS

| 2009/0275340 A1 | 11/2009 | Axelsson et al. |
| 2010/0135274 A1 | 6/2010 | Hong et al. |

(Continued)

FOREIGN PATENT DOCUMENTS

| CN | 101971684 | 2/2011 |
| CN | 103597765 | 2/2014 |

(Continued)

OTHER PUBLICATIONS

PCT/ISA/210 Search Report issued on PCT/KR2018/000859, pp. 9.

(Continued)

*Primary Examiner* — Thinh D Tran
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a $4^{th}$-Generation (4G) system with a technology for Internet of Things (IoT). The present disclosure may be applied to intelligent services based on the 5G communication tech- (Continued)

nology and the IoT-related technology, such as smart home, smart building, smart city, smart car, connected car, health care, digital education, smart retail, security and safety services. The present invention provides a method and a device for a terminal transmitting/receiving a signal while executing random access in a communication system, and provides a method and a device for configuring the size of an RBG and a PRG.

12 Claims, 21 Drawing Sheets

(56) References Cited

U.S. PATENT DOCUMENTS

| | | | |
|---|---|---|---|
| 2010/0303045 A1 | 12/2010 | Venkob et al. | |
| 2012/0008524 A1* | 1/2012 | Amirijoo | H04W 24/10 370/252 |
| 2012/0155310 A1* | 6/2012 | Kreuzer | H04W 52/262 370/252 |
| 2012/0300714 A1 | 11/2012 | Ng et al. | |
| 2014/0198677 A1* | 7/2014 | Xu | H04L 1/0009 370/252 |
| 2016/0029324 A1 | 1/2016 | Jang et al. | |
| 2016/0135143 A1 | 5/2016 | Won et al. | |
| 2016/0227520 A1 | 8/2016 | Davydov et al. | |
| 2016/0302080 A1* | 10/2016 | Hwang | H04W 72/0473 |
| 2018/0176934 A1* | 6/2018 | Uchino | H04W 72/1231 |
| 2019/0036653 A1* | 1/2019 | Lunttila | H04W 36/0005 |
| 2019/0230685 A1* | 7/2019 | Park | H04W 72/0453 |

FOREIGN PATENT DOCUMENTS

| | | |
|---|---|---|
| CN | 105794297 | 7/2016 |
| CN | 106105340 | 11/2016 |
| EP | 3 261 394 | 12/2017 |
| KR | 1020100130192 | 12/2010 |
| KR | 101214288 | 12/2012 |
| KR | 1020180049967 | 5/2018 |
| WO | WO 2015/083997 | 6/2015 |
| WO | WO 2016/133122 | 8/2016 |

OTHER PUBLICATIONS

PCT/ISA/237 Written Opinion issued on PCT/KR2017/000859, pp. 5.
Samsung, "Random Access Procedure in NR", R2-167568, 3GPP TSG-RAN WG2 #96, Nov. 14-18, 2016, 7 pages.
European Search Report dated Jan. 2, 2020 issued in counterpart application No. 18751091.2-1215, 9 pages.
European Search Report dated Jul. 15, 2020 issued in counterpart application No. 18751091.2-1215, 7 pages.
Chinese Office Action dated Sep. 27, 2020 issued in counterpart application No. 201880011198.X, 16 pages.

* cited by examiner

METHOD AND DEVICE FOR EXECUTING RANDOM ACCESS IN WIRELESS CELLULAR COMMUNICATION SYSTEM

PRIORITY

This application is a National Phase Entry of PCT International Application No. PCT/KR2018/000859 which was filed on Jan. 18, 2018, and claims priority to Korean Patent Application No. 10-2017-0018901, which was filed on Feb. 10, 2017, the content of each of which is incorporated herein by reference.

TECHNICAL FIELD

The disclosure relates to a wireless communication system and, more particularly, to a method and an apparatus for performing random access in a next-generation wireless cellular communication system, and an apparatus and a method for transmitting data.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The 5G communication system which has been currently researched considers applying various numerologies and using a channel bandwidth up to 100 MHz in order to meet various requirements and provide various services.

DISCLOSURE OF INVENTION

Technical Problem

A technical solution to be achieved by the disclosure is to provide a method of transmitting and receiving signals between an eNB and a terminal according to exact definition while the terminal performs random access in a mobile communication system. Further, due to supporting of a wide channel bandwidth, the technical solution is to provide a method and an apparatus for determining the resource block group (RBG) size for supporting the wide channel bandwidth and a method and an apparatus for configuring the precoding resource block group (PRG) size in order to increase PRG according to the use of a DMRS and improve channel estimation performance through PRB bundling.

Solution to Problem

In accordance with an aspect of the disclosure, a method of a terminal in a communication system includes: transmitting a random access preamble to an evolved node B (eNB); receiving a random access response message from the eNB; transmitting a message 3 to the eNB; receiving scheduling information for scheduling a message 4 corresponding to the message 3 from the eNB; receiving the message 4 from the eNB, based on the scheduling information; and transmitting control information indicating whether the message 4 is received from the eNB, wherein the random access response message is received based on a longest slot length among slot lengths which are applicable between the terminal and the eNB. The message 3 may be transmitted based on the longest slot length, a slot length of the message 4 may be the longest slot length or a length indicated by the scheduling information, and the control information may be transmitted to a physical uplink control channel (PUCCH) of a long format.

In accordance with another aspect of the disclosure, a method of an evolved node B (eNB) in a communication system includes: receiving a random access preamble from a terminal; transmitting a random access response message to the terminal; receiving a message 3 from the terminal; transmitting scheduling information for scheduling a message 4 corresponding to the message 3 to the terminal; transmitting the message 4 to the terminal, based on the scheduling information; and receiving, from the terminal, control information indicating whether the message 4 is received, wherein the random access response message is received based on a longest slot length among slot lengths which are applicable between the terminal and the eNB.

In accordance with another aspect of the disclosure, a terminal in a communication system includes: a transceiver; and a controller connected to the transceiver to perform control to transmit a random access preamble to an evolved node B (eNB), receive a random access response message from the eNB, transmit a message 3 to the eNB, receive scheduling information for scheduling a message 4 corresponding to the message 3 from the eNB, receive the message 4 from the eNB, based on the scheduling information, and transmit control information indicating whether the message 4 is received from the eNB, wherein the random access response message is received based on a longest slot length among slot lengths which are applicable between the terminal and the eNB.

In accordance with another aspect of the disclosure, an evolved node B (eNB) in a communication system includes: a transceiver; and a controller connected to the transceiver to perform control to receive a random access preamble from a terminal, transmit a random access response message to the terminal, receive a message 3 from the terminal, transmit scheduling information for scheduling a message 4 corresponding to the message 3 to the terminal, transmit the message 4 to the terminal, on the basis of the scheduling information, and receive, from the terminal, control information indicating whether the message 4 is received, wherein the random access response message is received on the basis of a longest slot length among slot lengths which are applicable between the terminal and the eNB.

Advantageous Effects of Invention

The disclosure may provide an effective cell initial access method in a 5G communication system supporting various numerologies, thereby efficiently operating a 5G wireless communication system simultaneously supporting various services having different requirements. Further, the disclosure may provide a method of configuring the RBG and PRG size in a 5G communication system, thereby minimizing the number of DCI bits to allocate resources and expecting improvement of channel estimation performance of a corresponding reference signal.

Figure 8:
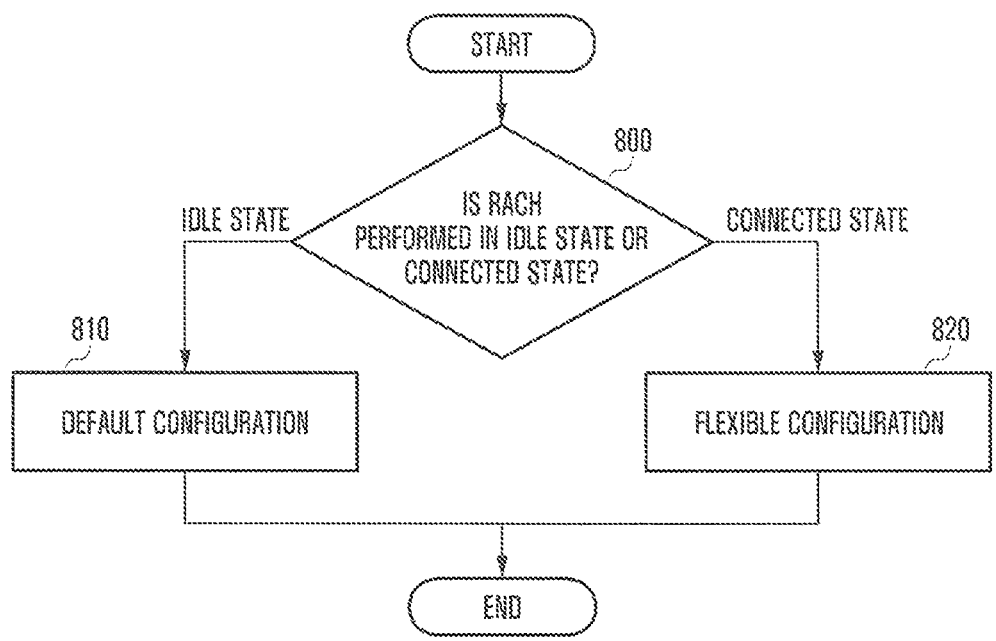
Figure 9:
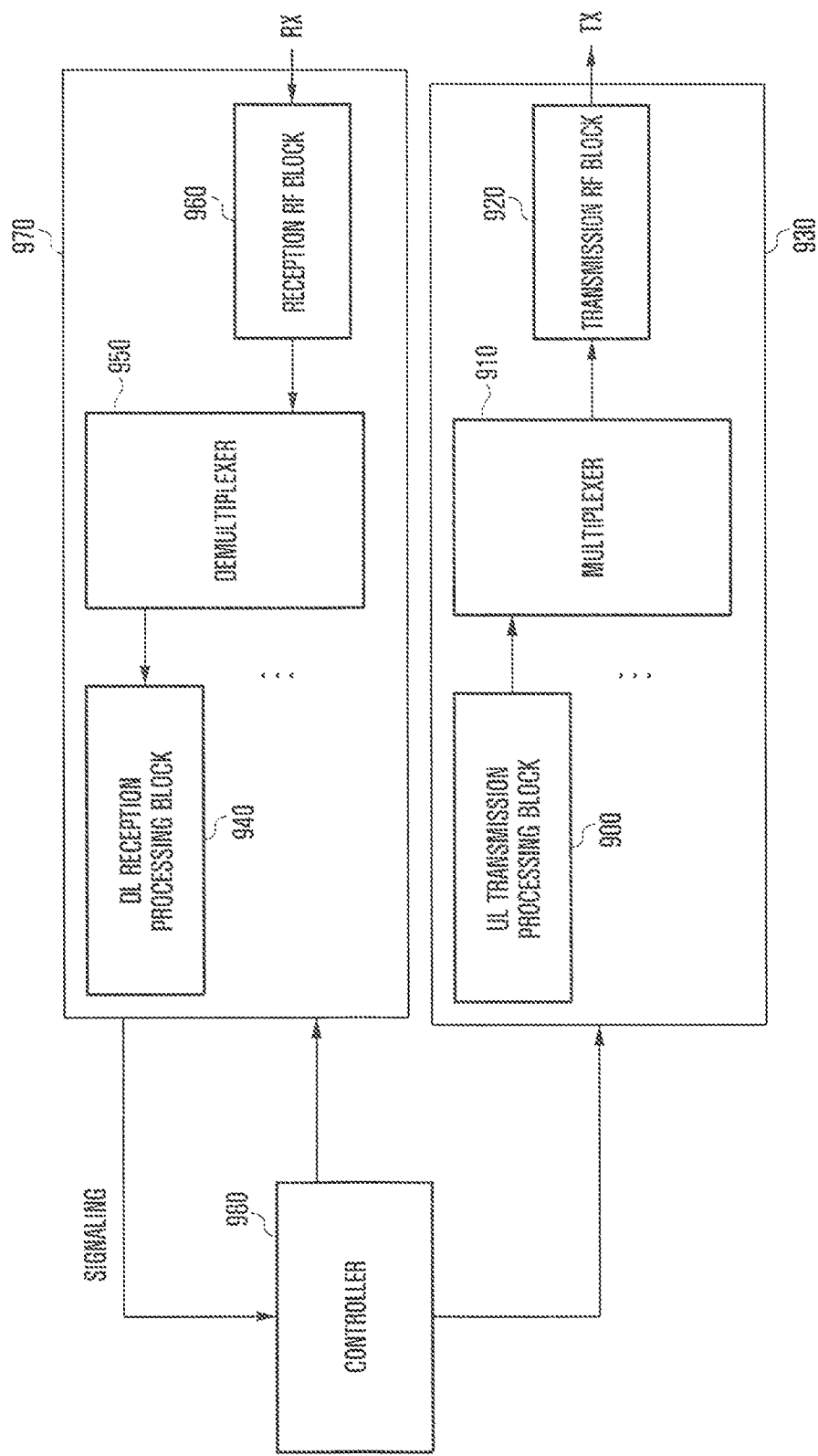
Figure 10:
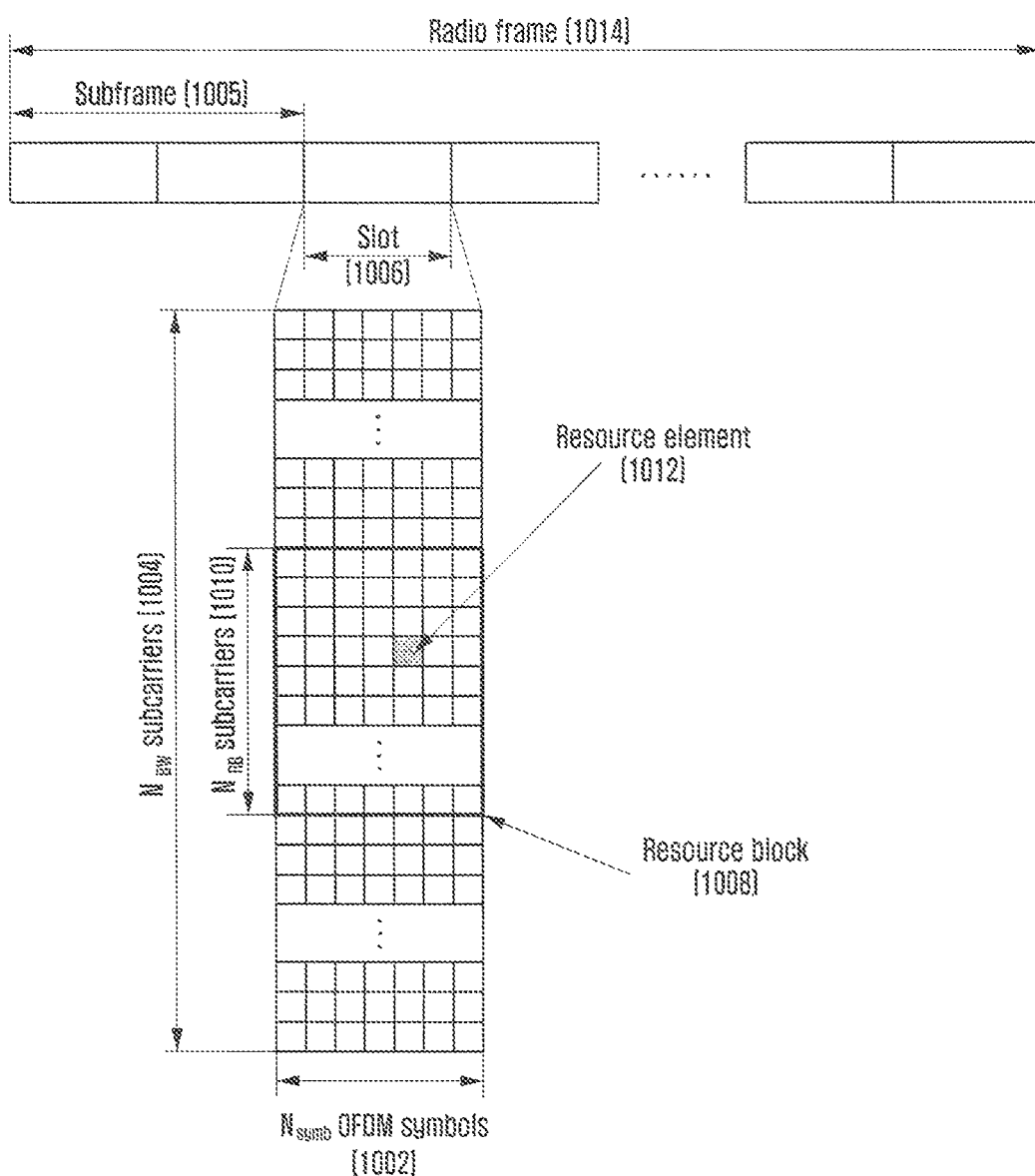
Figure 11:
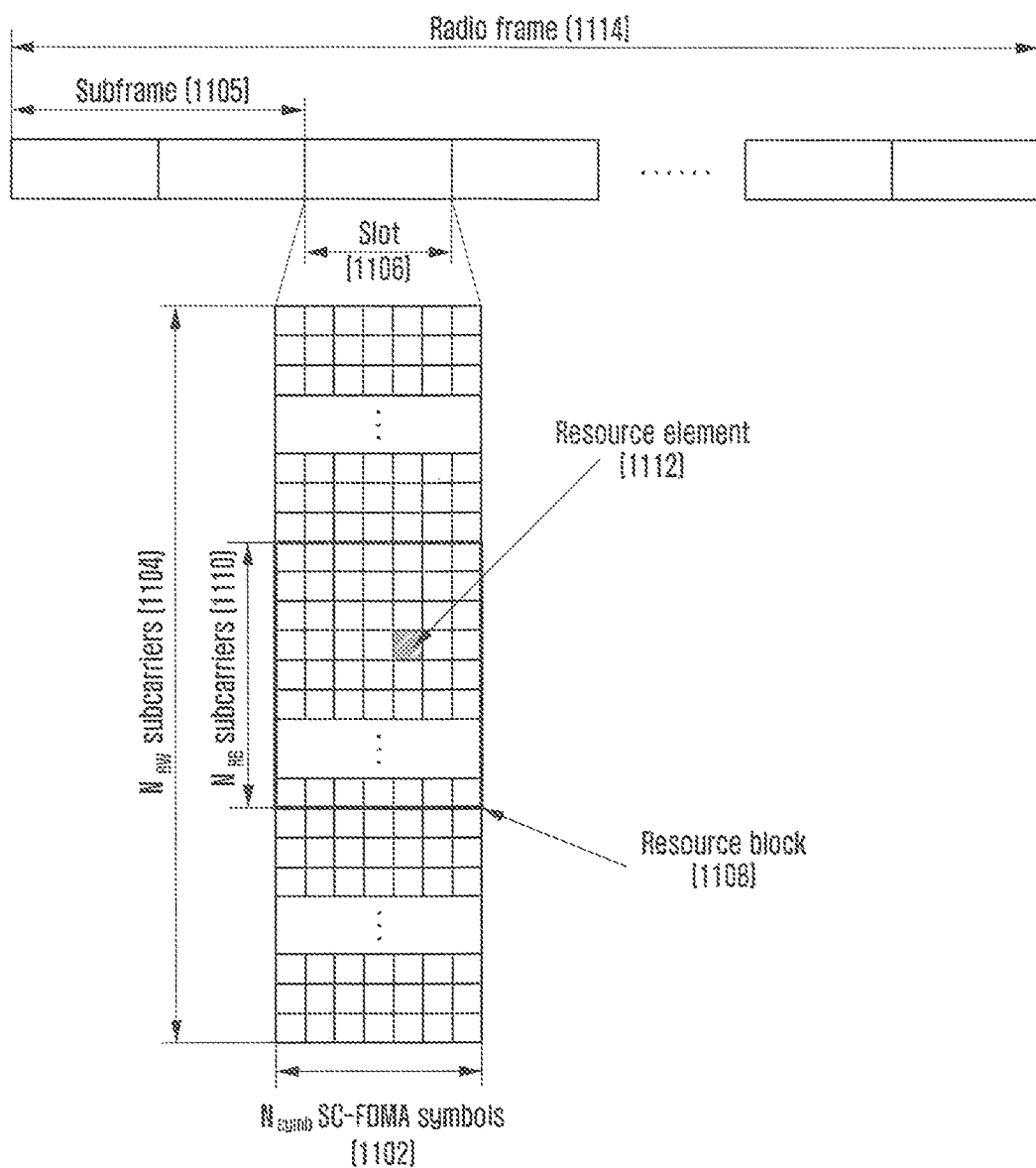
Figure 12:
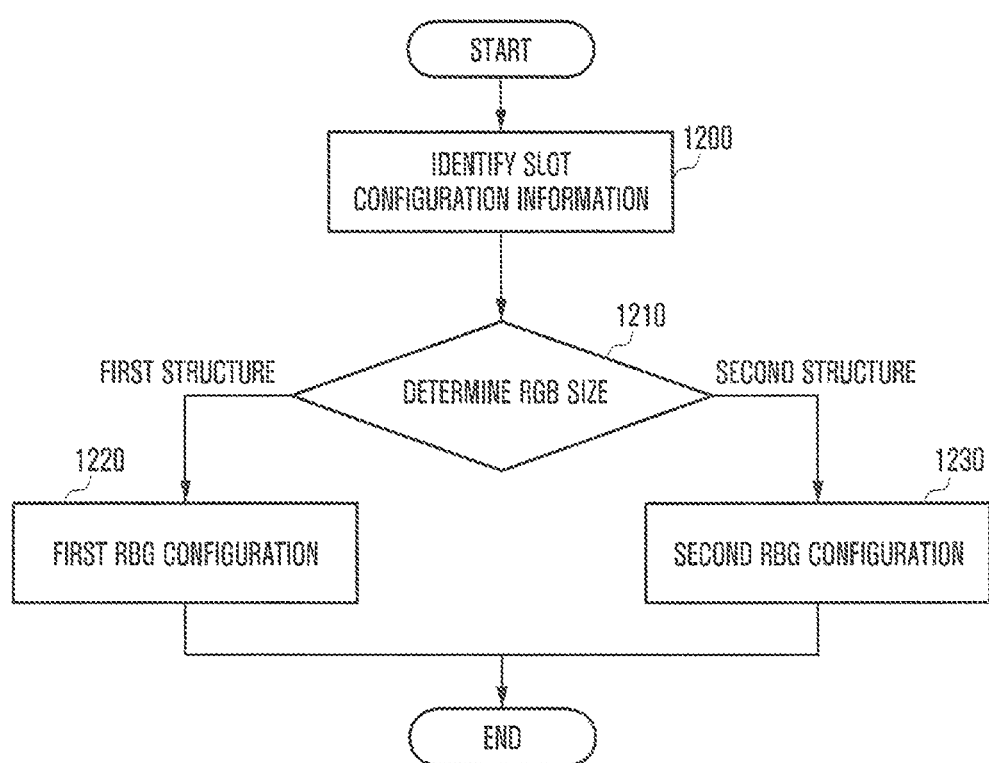
Figure 13:
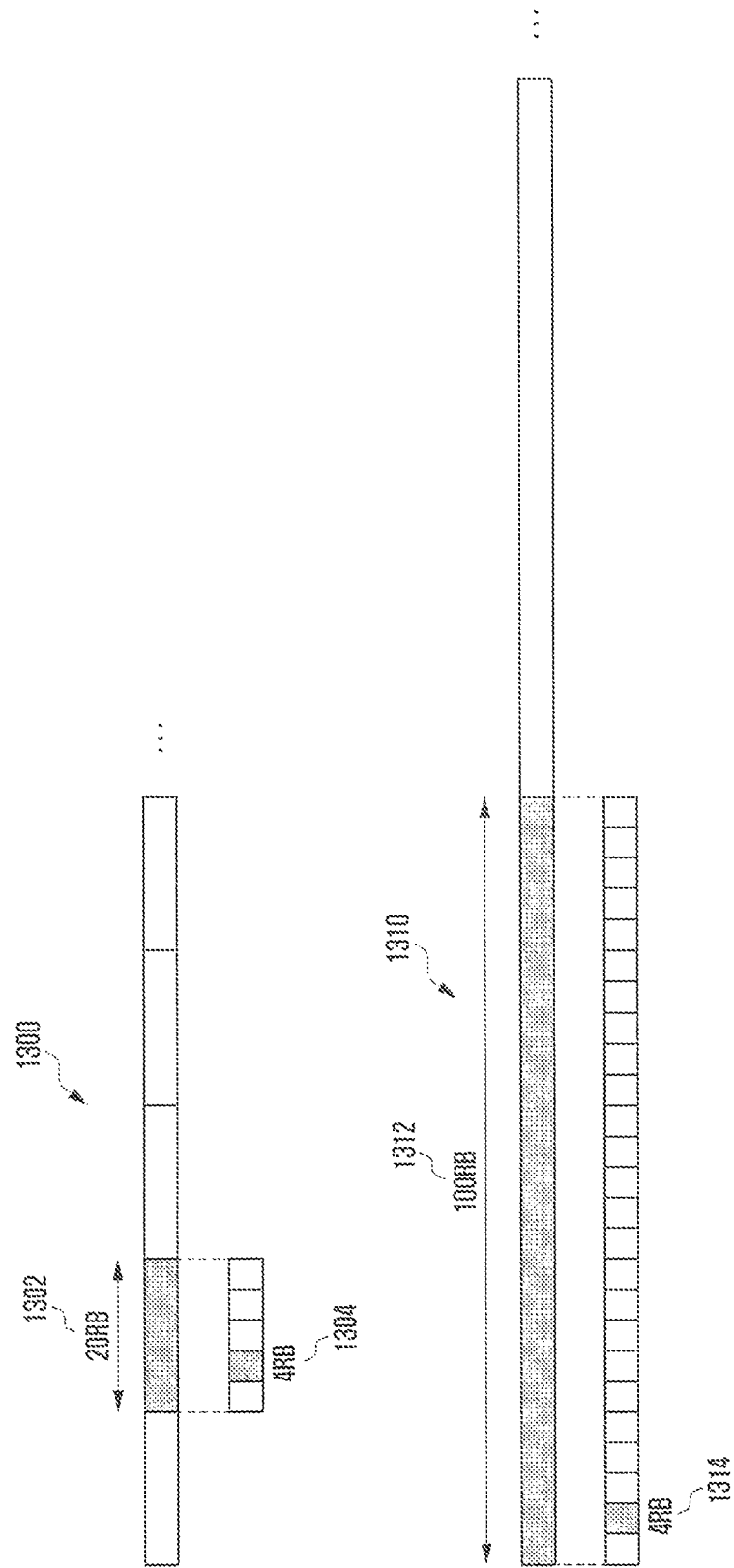
Figure 14:
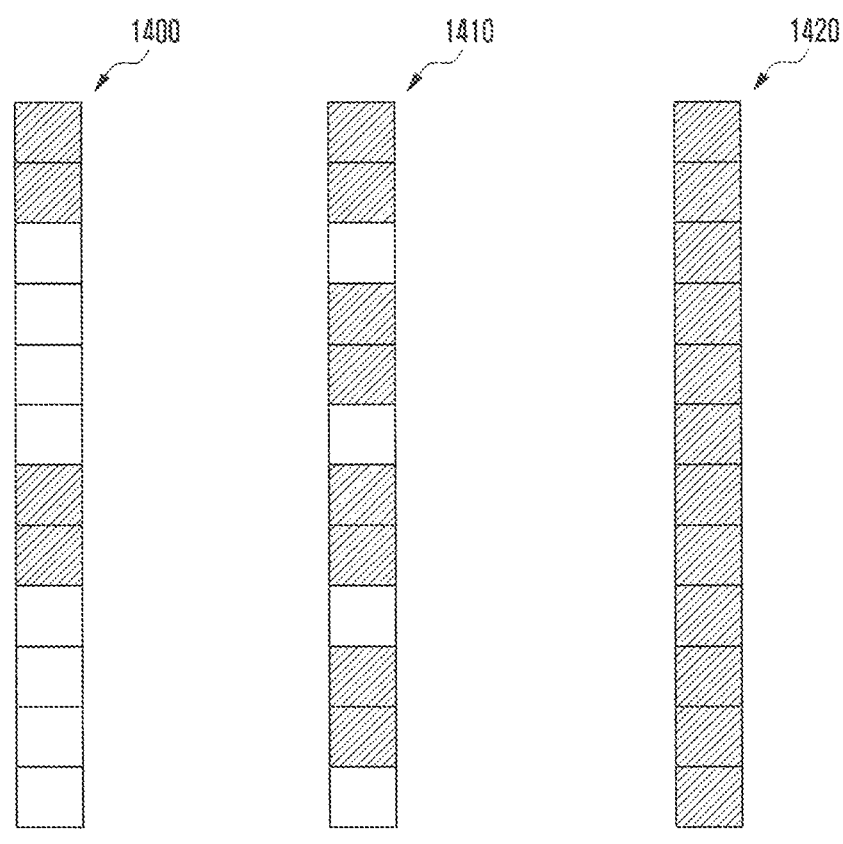
Figure 15:
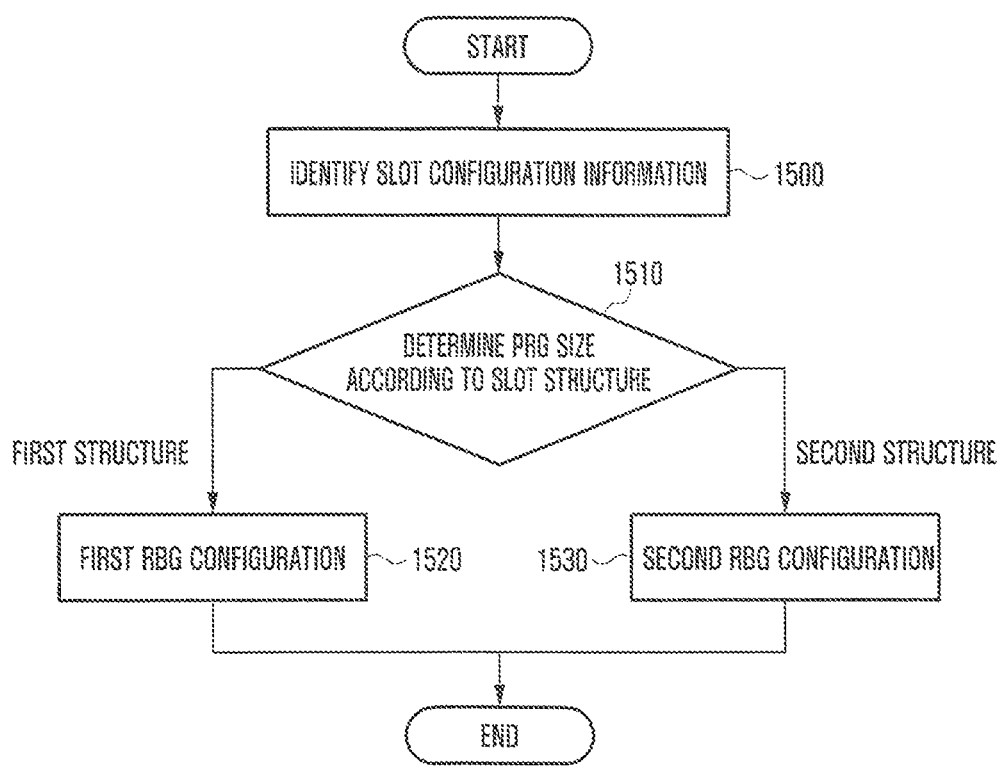
Figure 16:
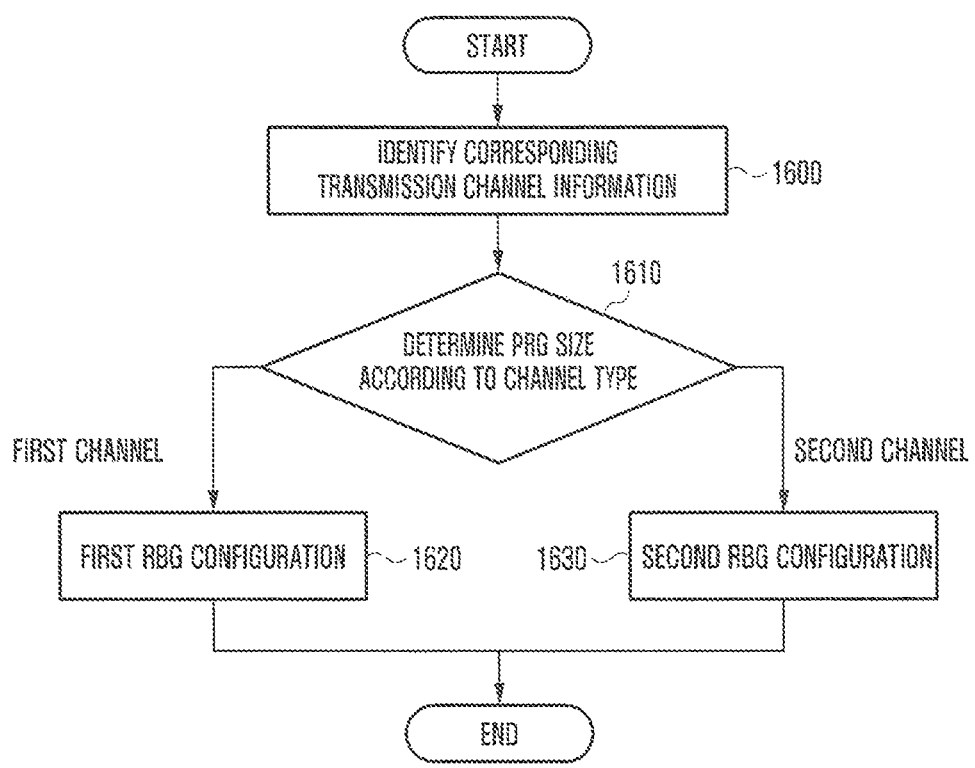
Figure 17:
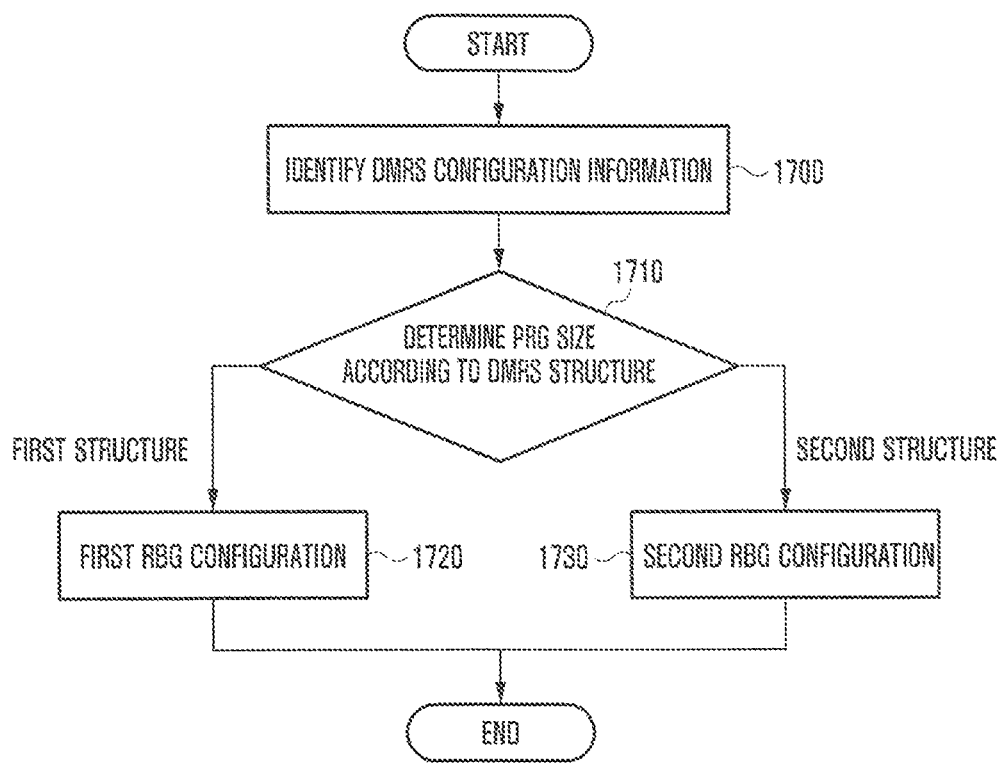
Figure 18:
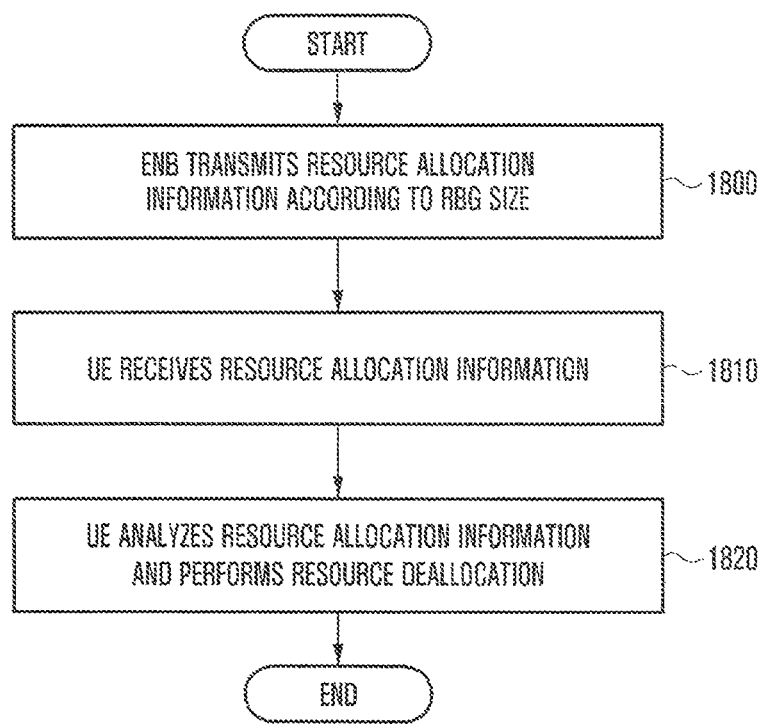
Figure 19:
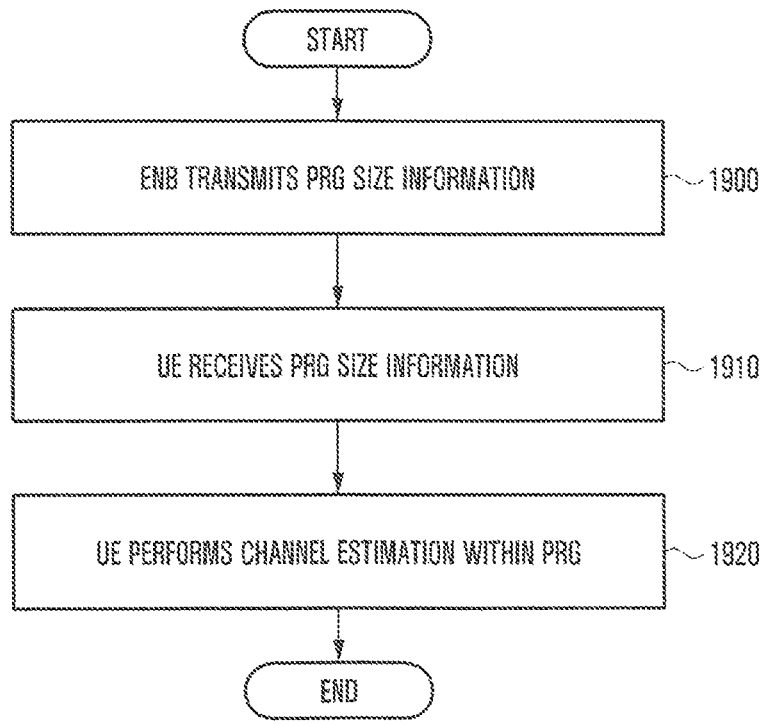
Figure 20:
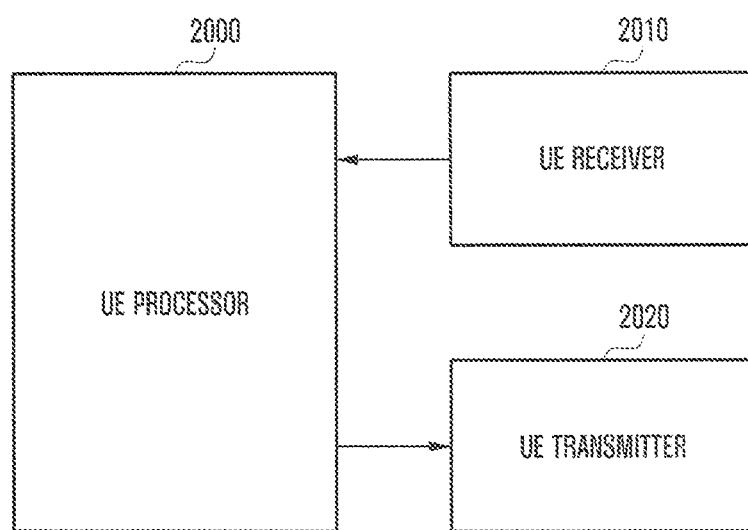
Figure 21:
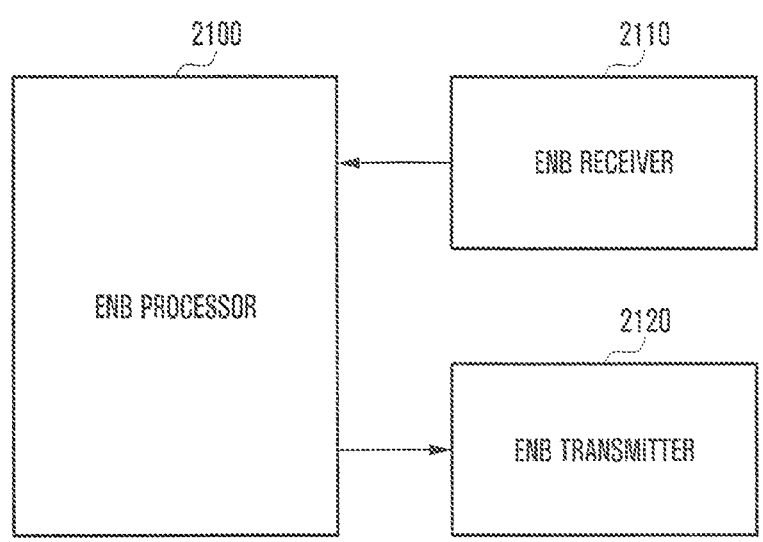

RIG. 7 illustrates a procedure of determining a transmission/reception method between the terminal and the eNB according to whether the terminal or the eNB has successfully completed random access or is performing a random access process;

FIG. 8 illustrates a procedure of a transmission/reception method between the terminal and the eNB according to whether a random access procedure is performed in an idle mode or a connected mode;

FIG. 9 illustrates a transmission/reception device of the terminal according to the disclosure;

FIG. 10 illustrates a basic structure of a time-frequency region which is a radio resource region in which data or control information is transmitted in the downlink of the LTE and LTE-A systems;

FIG. 11 illustrates a basic structure of the time-frequency region which is the radio resource region in which data or control information is transmitted in the uplink of the LTE and LTE-A systems according to the prior arts;

FIG. 12 illustrates a method of configuring an RBG by the terminal according to the disclosure;

FIG. 13 illustrates embodiment 2-2;

FIG. 14 illustrates examples of various DMRS structures mapped to one OFDM symbol;

FIG. 15 illustrates a first method of indirectly indicating the PRG size according to embodiment 2-3;

FIG. 16 illustrates a second method of indirectly indicating the PRG size according to embodiment 2-3;

FIG. 17 illustrates a third method of indirectly indicating the PRG size according to embodiment 2-3;

FIG. 18 illustrates the operations of the eNB and the terminal when the RBG size is configured;

FIG. 19 illustrates the operations of the eNB and the terminal when the PRG size is configured;

FIG. 20 is a block diagram illustrating an internal structure of the terminal according to an embodiment of the disclosure; and FIG. 21 is a block diagram illustrating an internal structure of the eNB according to an embodiment of the disclosure.

MODE FOR THE INVENTION

Hereinafter, embodiments of the present invention will be described in detail in conjunction with the accompanying drawings. In the following description of the present invention, a detailed description of known functions or configurations incorporated herein will be omitted when it may make the subject matter of the present invention rather unclear. The terms which will be described below are terms defined in consideration of the functions in the present invention, and may be different according to users, intentions of the users, or customs. Therefore, the definitions of the terms should be made based on the contents throughout the specification.

The advantages and features of the present invention and ways to achieve them will be apparent by making reference to embodiments as described below in detail in conjunction with the accompanying drawings. However, the present invention is not limited to the embodiments set forth below, but may be implemented in various different forms. The following embodiments are provided only to completely disclose the present invention and inform those skilled in the art of the scope of the present invention, and the present invention is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

First Embodiment

In order to process the recent explosive increase in mobile data traffic, discussion on a 5$^{th}$ generation (5G) system or new radio (NR) access technology after long term evolution (LTE or evolved universal terrestrial radio access (E-UTRA)) and LTE-advanced (LTE-A or E-UTRA Evolution) has been actively conducted. While the conventional mobile communication system focuses on general voice and data communication, the 5G system aims at meeting requirements and various services such as an enhanced mobile broadband (eMBB) service for enhancement of the conventional voice and data communication, a ultra-reliable and low latency communication (URLLC) service for high reliability and ultra-low latency, and a massive machine type communication (MTC) service supporting massive IoT communication.

While a bandwidth of a system transport band (transmission bandwidth) per single carrier in the conventional LTE and LTE-A system is limited to a maximum of 20 MHz, the 5G system mainly aims at supporting a high-speed data service reaching several Gbps using an ultra-wide bandwidth which is significantly wider than the 5G system. Accordingly, the 5G system considers, as a candidate frequency, an ultra-high frequency band from several GHz in which guaranteeing an ultra-wide bandwidth frequency is relatively easy to a maximum of 100 GHz. Additionally, it is considered to secure a wide bandwidth frequency for the 5G system through frequency rearrangement or allocation among frequency bands from hundreds of MHz to several GHz used in the conventional mobile communication system.

The radio wave of the ultra-high frequency band is also called a millimeter wave (mmWave) having a wavelength of several mm. However, since a propagation pathloss increases in proportion to a frequency band in the ultra-high frequency band, coverage of the mobile communication system becomes smaller.

In order to remove the disadvantage of the decrease in coverage of the ultra-high frequency band, a beamforming technology for increasing an arrival distance of the radio wave by concentrating radiation energy of the radio wave on a predetermined target point through a plurality of antennas is an important issue. The beamforming technology may be applied to each of a transmission end and a reception end. The beamforming technology has not only a coverage increase effect but also an effect of reducing interference in areas other than a beamforming direction. In order to operate the beamforming technology, an accurate method of measuring and feeding back transmitted/received beams is needed.

Another requirement of the 5G system is an ultra-low latency service having a transmission delay between transmission and reception ends which is around about 1 ms. A method of reducing the transmission delay is to design a frame structure based on a short transmission time interval (TTI) compared to LTE and LTE-A. The TTI is a basic time unit for scheduling, and the TTI in the conventional LTE and LTE-A systems is 1 ms corresponding to one subframe length. For example, the short TTI to meet requirements of the ultra-low latency service of the 5G system may include TTIs of 0.5 ms, 0.2 ms, and 0.1 ms shorter than that of the conventional LTE and LTE-A systems. Hereinafter, a frame structure of the LTE and LTE-A systems will be described with reference to the accompanying drawings and a design direction of the 5G system will be described.

Figure 1:
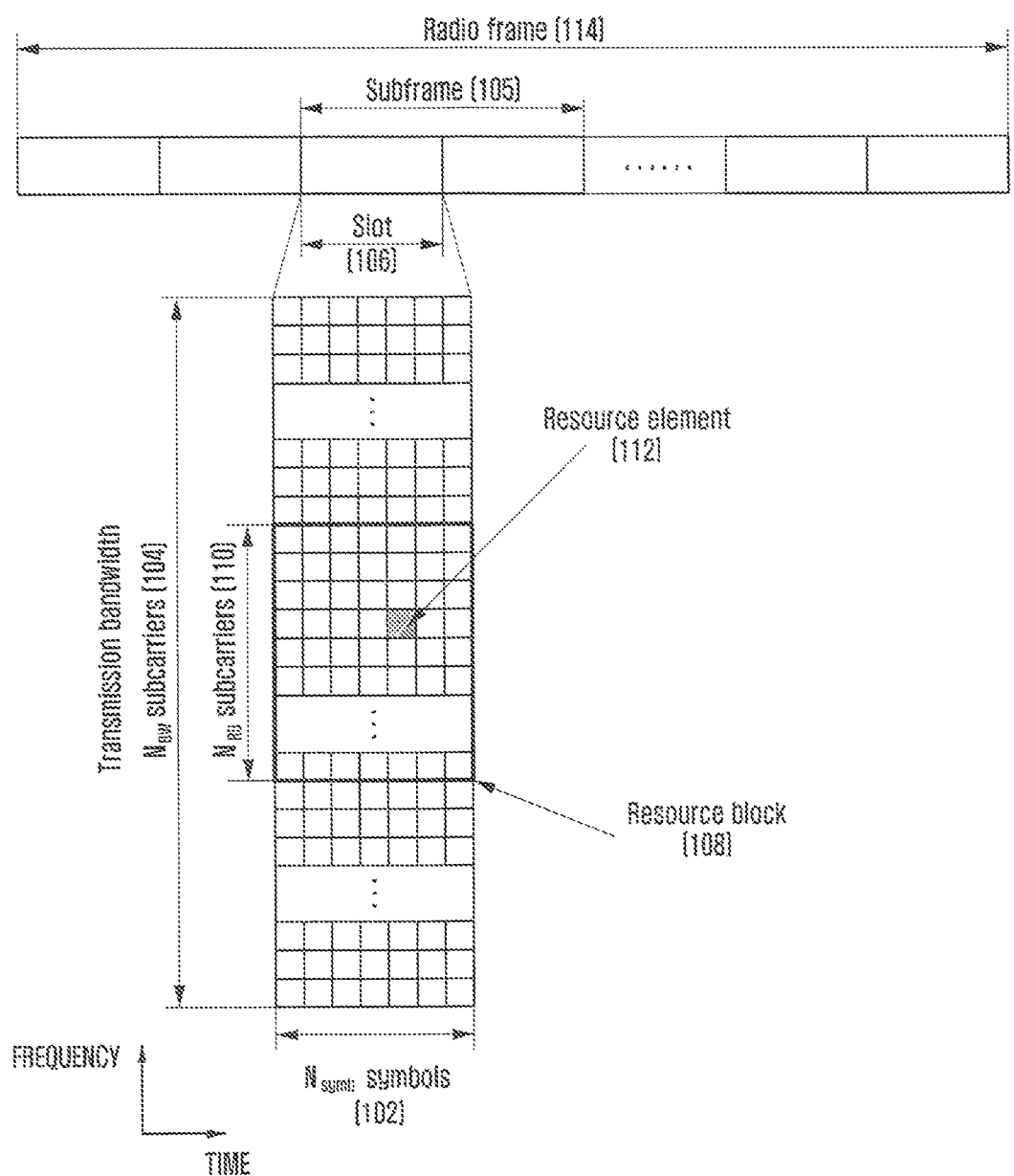
FIG. 1 illustrates a basic structure of a time-frequency frequency resource region which is radio resource region in which data or control information of the conventional LTE and LTE-A system is transmitted.

FIG. 1 illustrates a basic structure of a time-frequency frequency resource region which is radio resource region in which data or control information of the conventional LTE and LTE-A system is transmitted.

In FIG. 1, the horizontal axis indicates a time region and the vertical axis indicates a frequency region. An uplink (UL) is a radio link through which a terminal transmits data or a control signal to an evolved node B (eNB) and a downlink (DL) is a radio link through the eNB transmits data or a control signal to the terminal. A minimum transmission unit in the time region of the conventional LTE and LTE-A system is an orthogonal frequency division multiplexing (OFDM) system in the case of the downlink and is a single carrier-frequency division multiple access (SC-FDMA) system in the case of the uplink, and on slot 106 consists of $N_{symb}$ symbols 102 and one subframe 105 consists of 2 slots. The length of the slot is 0.5 ms, and the length of the subframe is 1.0 ms. A radio frame 114 is a time region unit consisting of 10 subframes. A minimum transmission unit in the frequency region is a subcarrier in units of 15 kHz (that is, subcarrier spacing=15 kHz) and a bandwidth of the whole system transport band (transmission bandwidth) consists of a total of $N_{BW}$ subcarriers 104.

A baric unit of resources in the time-frequency region is a resource element (RE) 112 and may be indicated by an OFDM system or an SC-FDMA system index and a subcarrier index. A resource block (RB or physical resource block (PRB)) 108 is defined by $N_{symb}$ successive OFDM symbols or SC-FDMA symbols 102 in time region and $N_{RB}$ successive subcarriers 110 in the frequency region. Therefore, one RB 108 consists of $N_{symb} \times N_{RB}$ REs 112. In the LTE and LTE-A system, data is mapped in units of RBs, and the eNB performs scheduling in units of RB pairs included in one subframe for a predetermined terminal. $N_{symb}$ which is the number of SC-FDMA symbols or OFDM symbols is determined according to the length of a cyclic prefix (CP) added to every symbol in order to prevent inter-symbol interference, and for example, $N_{symb}=7$ when a normal CP is applied and $N_{symb}=6$ when an expanded CP is applied. Compared to the normal CP, the expanded CP may be applied to a system having a relatively longer propagation transmission distance, thereby maintaining inter-symbol orthogonality.

The subcarrier spacing and the CP length are information necessary for OFDM transmission and reception, and smooth transmission and reception are possible only when the eNB and the terminal recognize a common value as the information.

$N_{BW}$ is proportional to a bandwidth of the system transport band and has a data rate that increases in proportional to the number of RBs scheduled to the terminal.

The frame structure of the LTE and LTE-A system is a design considering the normal voice and data communication and has a limitation on expandability to meet various services and requirements like the 5G system. Accordingly, the 5G system is required to flexibly define and operate the frame structure in consideration of various services and requirements.

Figure 2:
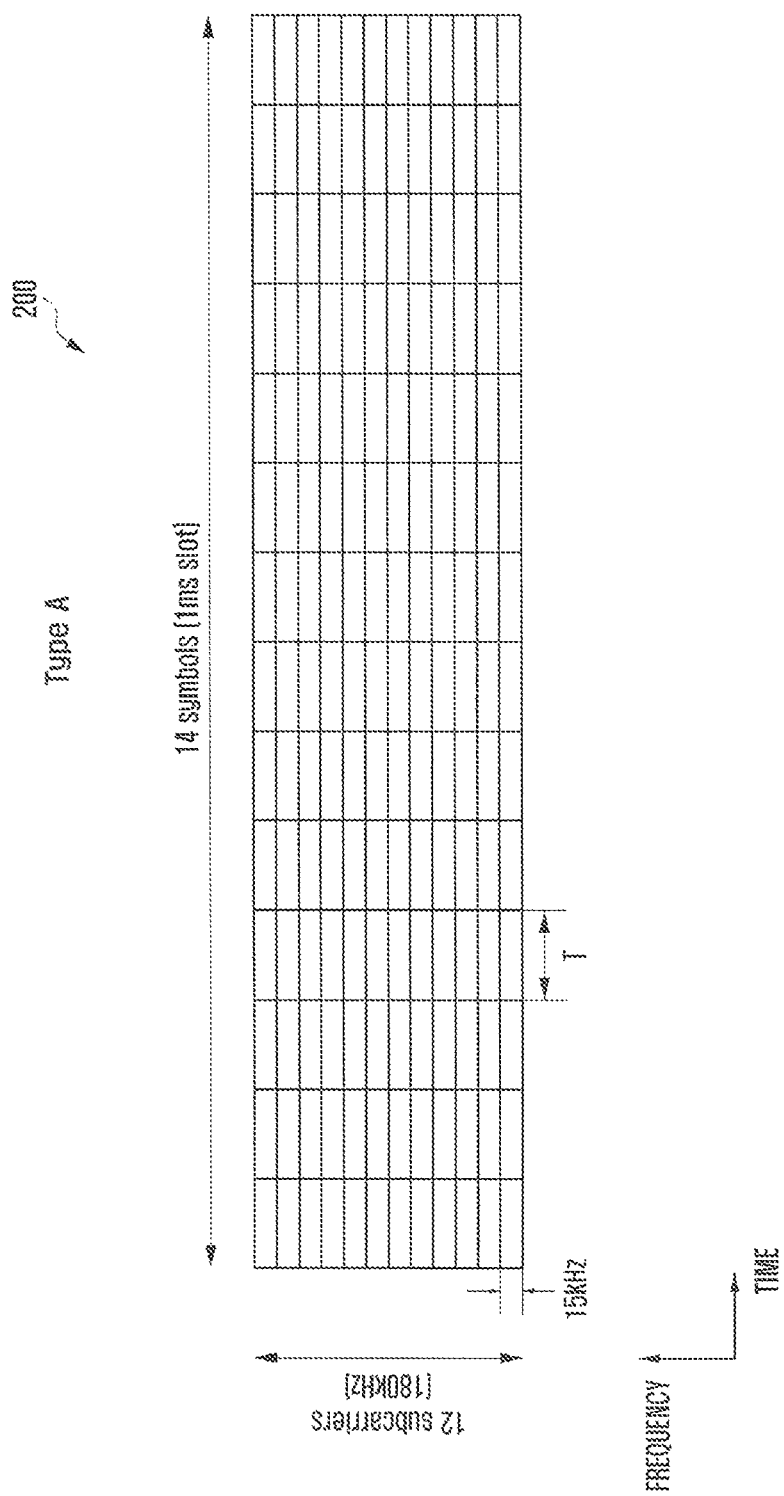
FIGS. 2, 3, and 4 illustrate examples of an expanded frame structure.
Figure 3:
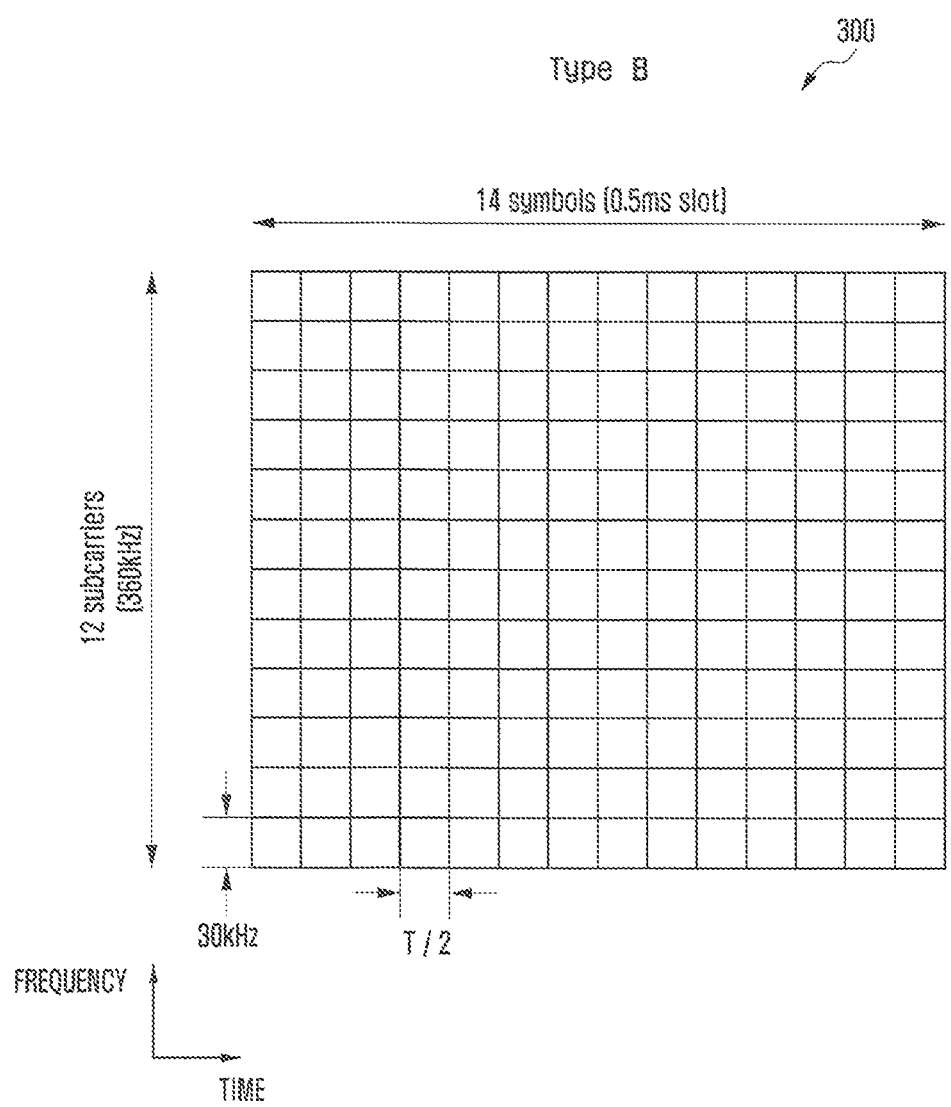
Figure 4:
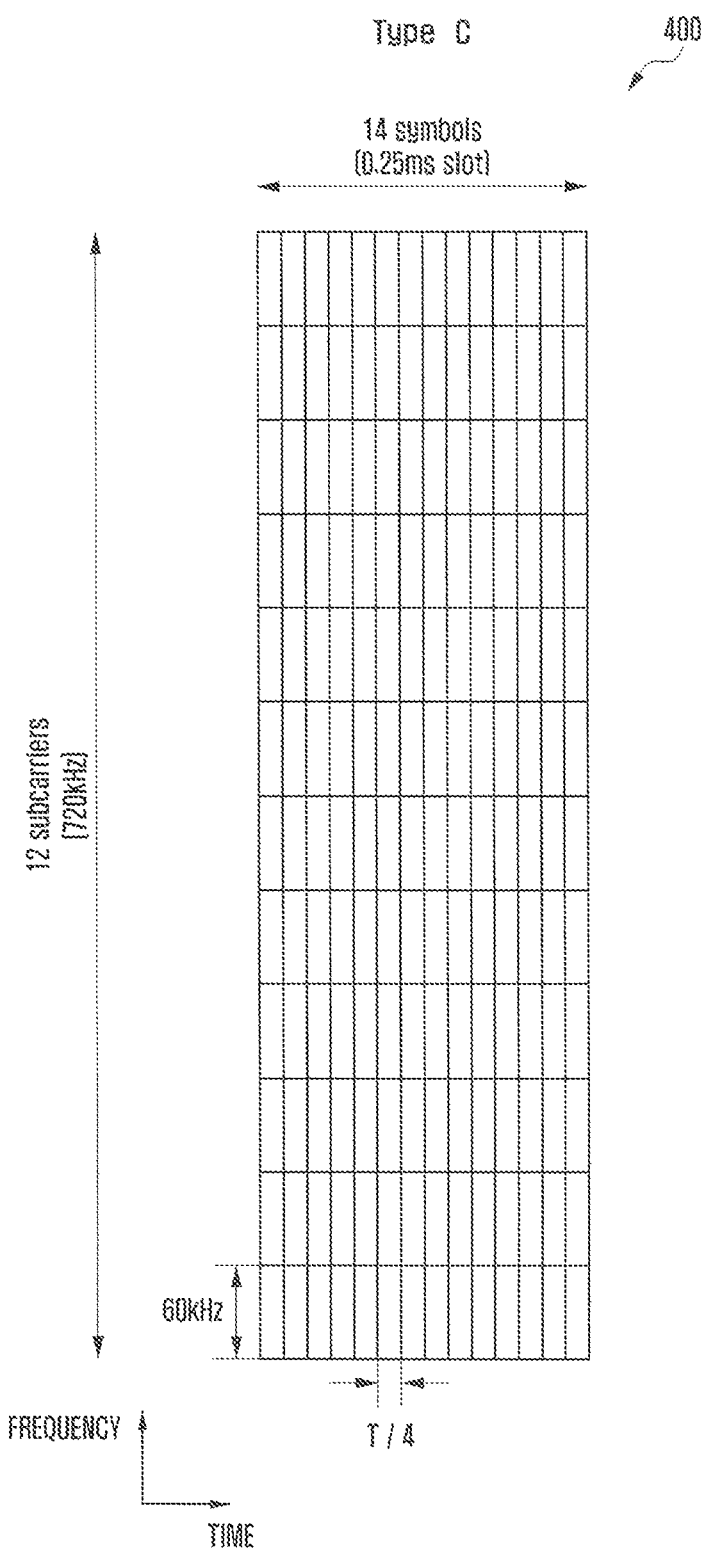

FIGS. 2, 3, and 4 illustrate examples of the expanded frame structure. In the examples of FIGS. 2, 3, and 4, a necessary parameter set defining the expanded frame structure includes the subcarrier spacing, the CP length, and the slot length. In the 5G system, a basic time unit to perform scheduling is a slot.

In the future initial introduction step of the 5G system, at least the coexist with the conventional LTE and LTE-A system or dual mode operation is expected. Accordingly, the conventional LTE and LTE-A system may provide stable system operation and the 5G system may serve to provide an improved service. Therefore, the expanded frame structure of the 5G system is required to include at least the frame structure or the necessary parameter set of LTE and LTE-A.

FIG. 2 illustrates a 5G frame structure like the frame structure of LTE and LTE-A or a necessary parameter set. Referring to FIG. 2, subcarrier spacing of frame structure type A 200 is 15 kHz, 14 symbols constitute a slot of 1 ms, and 12 subcarriers (=180 kHz=12×15 kHz) constitute 1 PRB.

FIG. 3 illustrates frame structure type B 300 in which subcarrier spacing 30 kHz, 14 symbols constitute a slot of 0.5 ms, and 12 subcarriers (=360 kHz=12×30 kHz) constitute 1 PRB. That is, compared to frame structure type A, the subcarrier spacing and the PRB size become 2 times and the slot length and the symbol length become ½ times.

FIG. 4 illustrates frame structure type C 400 in which subcarrier spacing 60 kHz, 14 symbols constitute a slot of 0.25 ms, and 12 subcarriers (=720 kHz=12×60 kHz) constitute 1 PRB. That is, compared to frame structure type A, the subcarrier spacing and the PRB size become 4 times and the slot length and the symbol length become ¼ times.

That is, when the frame structure type is generalized, the subcarrier spacing, the CP length, and the slot length which correspond to the necessary parameter set of each frame structure type have the relation of an integer multiple, thereby providing high expandability. In order to indicate a reference time unit irrelevant to the frame structure type, a subframe of a fixed length of 1 ms is defined. Accordingly, one subframe consists of one slot in frame structure type A, one subframe consists of two slots in frame structure type B, and one subframe consists of four slots in frame structure type C.

The above-described frame structure types may be applied to correspond to various scenarios. In a viewpoint of the cell size, a larger cell can be supported as the CP length is longer, so that frame structure type A may support a larger cell than frame structure types B and C. In a viewpoint of the operation frequency band, the longer subcarrier spacing is advantageous to reconstruction of phase noise of a high frequency band, so that frame structure type C may support a relatively higher operation frequency than frame structure types A and B. In a viewpoint of service, the shorter subframe length is advantageous to support an ultra-low latency service like URLLC, so that frame structure type C is relatively more suitable for the URLLC service than frame structure types A and B.

Further, the several frame structure types may be multiplexed and integratively operated within one system.

Further, in order to meet various services and requirements of the 5G system, a transmission/reception bandwidth of the terminal, a waveform, and an uplink control channel transmission format as well as the expanded frame structure may be variously defined for every terminal.

As described above, signal transmission/reception in an ultra-wide bandwidth of scores to hundreds of MHz or several GHz is considered to achieve an ultra-high speed data service reaching several Gbps in the 5G system. However, in order to support various types of 5G UEs, a transmission/reception bandwidth supported for each terminal may vary. For example, terminal A may support signal transmission/reception in a maximum of 1 GHz bandwidth and terminal B may support signal transmission/reception in a maximum of 100 MHz bandwidth. On the side of the eNB, terminal A and terminal B should be simultaneously supported within the 5G system.

An uplink waveform of the terminal basically applies an OFDM scheme, but may additionally apply a discrete Fourier transform-spread-orthogonal frequency division multiplexing (DFT-S-OFDM or SC-FDMA) scheme capable of securing a relatively wide coverage. Whether to support DFT-S-OFDM may be defined by UE capability, and accordingly, UEs may be divided into a terminal which supports DFT-S-OFDM and a terminal which does not support DFT-S-OFDM.

Similar to the case of the uplink waveform of the terminal, transmission formats of an uplink control channel (physical uplink control channel: PUCCH) may be defined to be separated into a long format and a short format depending on the coverage. That is, it is possible to meet respective coverage requirements by applying the long format having a relatively long PUCCH transmission interval when the wide coverage is required and applying the short format otherwise.

When the expanded frame structure, the transmission/reception bandwidth of the terminal, the waveform, and the uplink control channel transmission format are variously operated for each terminal, it is required to make communication between the terminal and the eNB smooth by defining a scheme applied to an initial access step such as random access in which the eNB has no advance information of the terminal.

A main subject of the disclosure is to determine the expanded frame structure, the transmission/reception bandwidth of the terminal, the waveform, and the uplink control channel transmission format to be applied to a transmission/reception signal between the terminal and the eNB according to whether the eNB has advance information on the terminal.

Hereinafter, the main subject of the disclosure will be described through detailed embodiments.

Embodiment 2-1

In an initial access step in which the terminal initially accesses the system, the terminal synchronizes downlink time and frequency regions on the basis of a synchronization signal through a cell search and acquires a cell ID. The terminal receives system information from the eNB and acquires default parameter values related to transmission and reception such as a system bandwidth or relevant control information. Thereafter, the terminal performs a random access procedure to switch a link with the eNB to a connected state. When the random access procedure is completed, the terminal switches the link to the connected state and transmits UE capability information indicating a function supported by the terminal itself among various communication functions to the eNB. For example, the terminal may inform the eNB of whether the terminal supports the expanded frame structure, the transmission/reception bandwidth of the terminal, and the uplink control channel transmission format or detailed parameter values through UE capability information. Accordingly, the eNB can perform transmission/reception operation suitable for the UE capability of the corresponding terminal only after acquiring the UE capability information of the terminal after the random access procedure of the terminal is completed. That is, before the terminal acquires the UE capability information of the terminal, a mutually appointed transmission/reception method between the terminal and the eNB should be defined.

Figure 5:
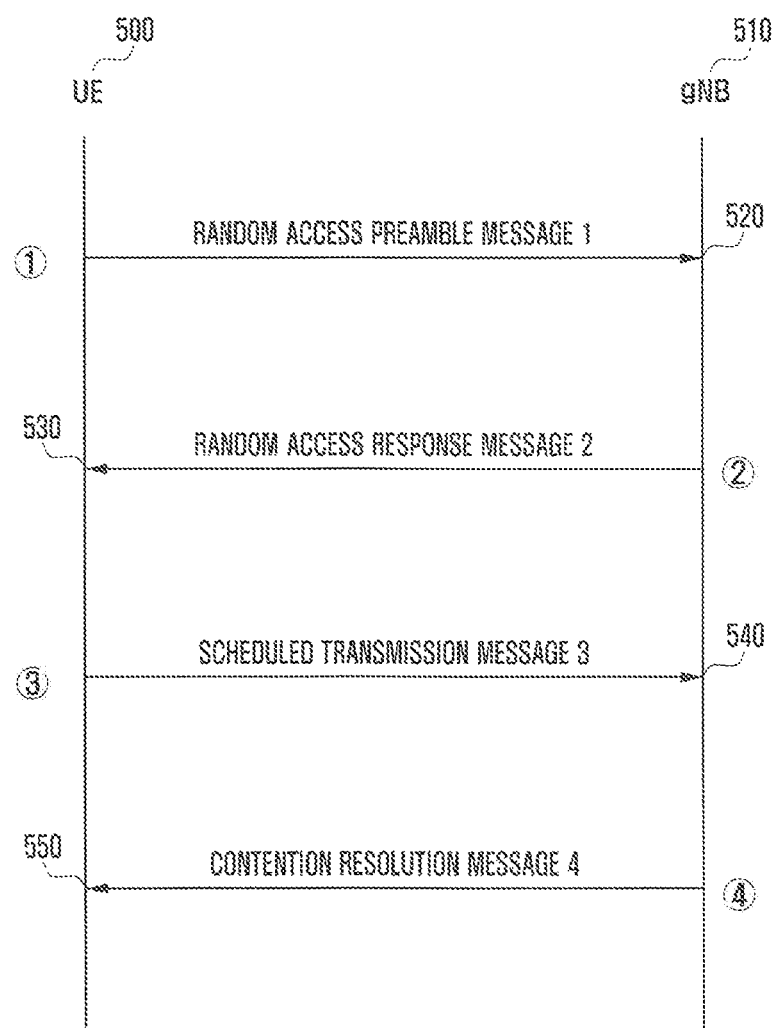
FIG. 5 illustrates a random access procedure.

Hereinafter, the random access procedure will be described in detail with reference to FIG. 5. FIG. 5 illustrates the random access procedure. Referring to FIG. 5, in a first step 520 of the random access procedure, a user equipment (UE) 500 transmits a random access preamble to an eNB. Then, the eNB 510 measures a transmission delay value between the terminal and the eNB and perform uplink synchronization. At this time, the terminal selects the random access preamble, to be used, from a random access preamble set given in advance by eh system information. Initial transmission power of the random access preamble is determined according to a pathloss between the terminal and the eNB, measured by the terminal.

In a second step 530, the eNB 510 transmits a timing control command to the UE 500 on the basis of the transmission delay value measured in the first step. Further, the eNB transmits uplink resources to be used by the terminal and a power control command together as scheduling information. When the terminal does not receive scheduling information (random access response, message 2) from the eNB in the second step 530, the terminal performs again the first step 520.

In a third step 540, the UE 500 transmits uplink data (message 3) including its own terminal ID to the eNB 510 through the uplink resources allocated in the second step 530. At this time, transmission timing and transmission power of the terminal follow the command received from the eNB in the second step 530.

Last, in a fourth step 550, when it is determined that the UE 500 performs random access without any collision with another terminal, the eNB 510 transmits data (message 4) including an ID of the terminal transmitting uplink data in the third step 540 to the corresponding terminal. When a signal transmitted by the eNB in the fourth step 550 is received, the terminal determines that the random access is successful.

When the data transmitted by the terminal in the third step 540 collides with data of another terminal and thus the eNB fails in receiving a data signal from the terminal, the eNB does not transmit data to the terminal anymore. Accordingly, when the terminal does not receive data transmitted in the fourth step 550 from the eNB for a predetermined time period, the terminal determines that the random access procedure fails and returns to the first step 520. When the random access is successful, the terminal configures initial transmission power of an uplink data channel or a control channel transmitted to the eNB on the basis of a transmission power value of the terminal which is power-controlled by the random access.

In the first step of the random access procedure, the subcarrier spacing and the transmission bandwidth of a random access preamble (message 1) transmitted by the terminal may be defined by the following method.

[Subcarrier Spacing of Random Access Preamble]

Method 1: subcarrier spacing of the random access preamble is determined according to subcarrier spacing applied to a downlink synchronization signal or a physical broadcast channel (PBCH) for transmitting system information. For example, when the subcarrier spacing applied to the downlink synchronization signal or the PBCH is 15 kHz, the subcarrier spacing of the random access preamble may be also determined as 15 kHz or defined as a predetermined value (for example, 15 kHz×N) calculated from 15 kHz.

Method 2: subcarrier spacing of the random access preamble is determined according to a frequency band of a cell for which the random access is performed. For example, first subcarrier spacing which is relatively narrow is applied to a low frequency band and second subcarrier spacing which is relatively wide is applied to a high frequency band having an available wide bandwidth. The first subcarrier spacing and the second subcarrier spacing are defined as fixed values in advance for each frequency band in which the 5G system operates.

[Transmission Bandwidth of Random Access Preamble]

A transmission bandwidth of the random access preamble is determined according to a frequency band of a cell for which the random access is performed. For example, a relatively narrow transmission bandwidth (first bandwidth) is applied to a low frequency band and a relatively wide transmission bandwidth (second bandwidth) is applied to a high frequency band having an available wide bandwidth. The first bandwidth and the second bandwidth are defined as fixed values in advance for each frequency band in which the 5G system operates.

The subcarrier spacing, the transmission bandwidth, and the slot length of the message 2 transmitted by the eNB in the second step of the random access procedure may be defined by the following method.

[Subcarrier Spacing of Message 2]

Subcarrier spacing of the message 2 follows subcarrier spacing determination method 1 or 2 of the message 1.

[Transmission Bandwidth of Message 2]

A smaller value between a minimum reception bandwidth defined in the 5G system and a downlink system bandwidth of the corresponding cell is determined as the transmission bandwidth of the message 2. Accordingly, although the eNB does not know a reception bandwidth actually supported by the terminal in the second step of the random access procedure, it is possible to prevent the message 2 from being transmitted beyond the reception bandwidth of the terminal.

[Slot Length of Message 2]

As a length of a slot which is a transmission length of a signal to be transmitted is shorter, faster transmission and reception are possible, but coverage may decrease due to the lack of reception energy. Accordingly, at least during the random access procedure in which a communication link between the terminal and the eNB has not yet completely connected, wide coverage is supported by applying the longest slot length among a plurality of slot lengths. Thereafter, when the terminal completes the random access procedure and switches the link with the eNB to the connected state, the eNB may adaptively control the slot length according to feedback from the terminal.

The subcarrier spacing, the transmission bandwidth, the slot length, and the waveform of the message 3 transmitted by the terminal in the third step of the random access procedure may be defined by the following method.

[Subcarrier Spacing of Message 3]

Subcarrier spacing of the message 1 follows subcarrier spacing determination method 1 or 2 of the message 1.

[Transmission Bandwidth of Message 3]

Method 1: follows a transmission bandwidth determination method of the message 1.

Method 2: limits to a minimum transmission bandwidth supported by the terminal.

[Slot Length of Message 3]

Method 1: follows a slot length determination method of the message 2.

Method 2: the eNB informs the terminal of a slot length to be applied to the message 3 through the message 2 or control information for scheduling the message 2. In this case, the eNB determines whether the terminal located near the eNB or far from the eNB on the basis of the message 1. For example, when a received signal intensity of the message 1 is low, the eNB may determine that the terminal is located far from the eNB and instruct the terminal to use a relatively long slot length for transmission of the message 3 in order to secure wide coverage. In contrast, when the received signal intensity of the message 1 is high, the eNB may determine that the terminal is located near the eNB and instruct the terminal to use a relatively short slot length for transmission of the message 3.

[Waveform of Message 3]

Method 1: the eNB informs the terminal of a waveform to be applied to the message 3 through the message 2 or control information for scheduling the message 2. Alternatively, the eNB informs the terminal of an uplink waveform supported by the eNB. For example, the eNB may inform that the eNB support only the OFDM or both the OFDM and the DFT-S-OFDM. Alternatively, the eNB informs the terminal of the uplink waveform supported by the eNB through system information or informs the terminal of the waveform to be applied to the message 3 through the message 2 or control information for scheduling the message 2.

Fixes to Method 2: OFDM Scheme.

Method 3: fixes to DFT-S-OFDM scheme.

The subcarrier spacing, the transmission bandwidth, and the slot length of the message 4 transmitted by the eNB in the fourth step of the random access procedure may be defined by the following method.

[Subcarrier Spacing of Message 4]

Subcarrier spacing of the message 1 follows subcarrier spacing determination method 1 or 2.

[Transmission Bandwidth of Message 4]

The transmission bandwidth of the message 2 follows a transmission bandwidth determination method of the message 2.

[Slot Length of Message 4]

Method 1: follows a slot length determination method of the message 2.

Method 2: inserts slot length-related control information into scheduling information of the message 4 and informs the terminal of the same.

A transmission format of the PUCCH for transmitting HARQ-ACK (acknowledgement) or NACK (non-acknowledgement) corresponding to the message 4 received by the terminal in the fourth step of the random access procedure may be defined by the following method.

Method 1: applies a transmission format fixed to a long format supporting wide coverage.

Method 2: inserts PUCCH transmission format-related control information into scheduling information of the message 4 and notifies the terminal of the same.

When the random access procedure is successfully completed, the terminal switches the link with the eNB to the connected state and thus data transmission/reception between the terminal and the eNB becomes possible. The eNB may make a request for reporting UE capability information of the terminal to the connected-state terminal (through a UE capability enquiry message) and the terminal reports its own UE capability information to the eNB. The UE capability information includes at least one piece of the capability information including the expanded frame structure, the subcarrier spacing, the slot length, the transmission/reception bandwidth of the terminal, and the uplink control channel transmission format.

Figure 6:
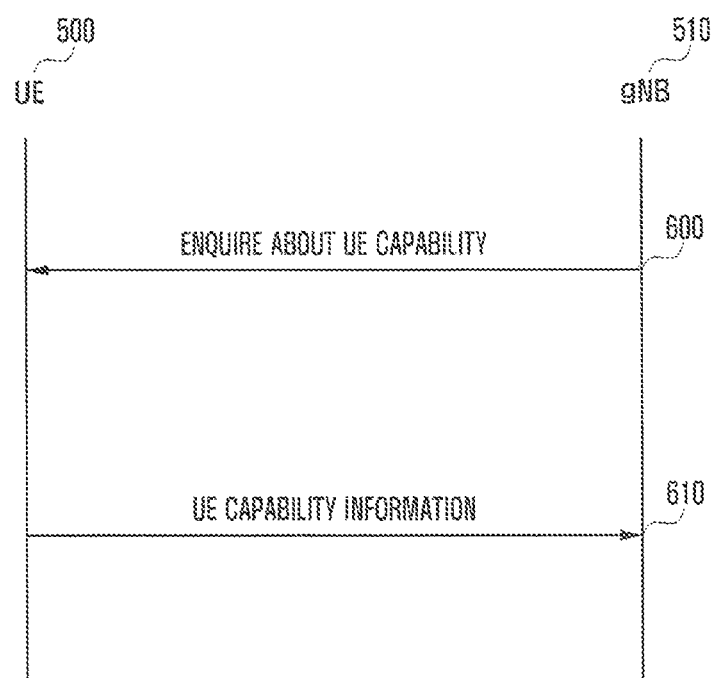
FIG. 6 illustrates a UE capability report procedure of a terminal.

FIG. 6 illustrates a UE capability report procedure of the terminal. When the eNB 510 makes a request for reporting UE capability information to the connected-state UE 500 through a UE capability enquiry message in step 600, the terminal reports its own UE capability information to the terminal in step 610. When the UE capability information report procedure is successfully completed, uncertainty of the UE capability is resolved and thus the eNB can perform flexible scheduling within the UE capability.

Figure 7:
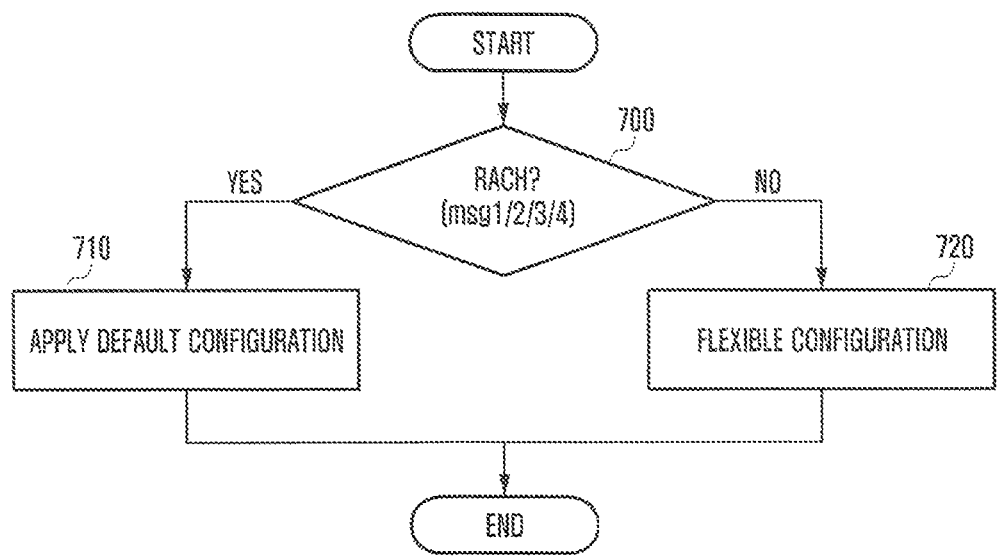

FIG. 7 illustrates a procedure of determining a method of transmission/reception between the terminal and the eNB according to whether the terminal or the eNB successfully completes random access or is performing the random access process with reference to the above description. In step 700, the terminal or the eNB determines whether the terminal is currently performing random access. When the terminal is performing random access, that is, when the terminal is in one of the first step to the fourth step of the random access procedure, the terminal or the eNB applies a default configuration as a transmission/reception method between the terminal and the eNB in step 710. The default configuration corresponds to a pre-appointed value between the terminal and the eNB and may be fixed to a predetermined value according to the standard or notified to the terminal by the eNB through system information. The default configuration may include at least one piece of the control information including the expanded frame structure to be applied to a transmission/reception signal between the terminal and the eNB, the subcarrier spacing, the transmission/reception bandwidth of the terminal, the waveform, and the uplink control channel transmission format, and each piece of the control information is determined as a fixed value.

When it is determined that the terminal successfully completes the random access procedure in step 700, flexible scheduling can be performed within UE capability according to scheduling by the eNB in step 720. Various applications such as the expanded frame structure, the subcarrier spacing, the transmission/reception bandwidth of the terminal, the waveform, and the uplink control channel transmission format as well as the values appointed as the default configuration are possible within UE capability.

In a modified example of the description of FIG. 7, the procedure between the terminal and the eNB may be defined with an additional determination condition indicating whether the terminal is in a connected state or an idle state. When the random access procedure for initial access is successfully completed, the terminal performs state transition from the idle state to the connected state. However, even the terminal in the connected state may have an additional random access procedure in a handover for movement between cells and a timing control procedure in order to perform time synchronization between the terminal and the eNB. In this case, the eNB has already secured UE capability information of the terminal in the connected state, so that the eNB has resolved uncertainty for the UE capability unlike the random access operation for initial access. Accordingly, flexible scheduling is possible within the UE capability.

FIG. 8 illustrates a procedure of determining a transmission/reception method between the terminal and the eNB according to whether the random access procedure is performed in the idle mode or the connected mode according to the above description.

Referring to FIG. 8, unlike the case of FIG. 7, it is determined whether the terminal is performing random access and additionally determined whether the terminal is in the connected state or the idle state in step 800. When the terminal is currently in the idle state and is performing the random access procedure on the basis of the determination result, the default configuration is applied to the transmission/reception method between the terminal and the eNB in step 800. When the terminal is currently performing random access in the connected state or has already successfully completed the random access on the basis of the determination result of step 800, flexible scheduling is possible within UE capability of the EU according to eNB scheduling in step 820. The eNB references channel state information measured by the terminal for the flexible scheduling and reported to the eNB, a sounding reference signal (SRS) corresponding to a reference signal which the terminal transmits to the eNB to estimate an uplink channel state, or a type of traffic (for example, sensitive to a transmission delay or not) to be scheduled.

In another modified example of the description of FIG. 8, the default configuration is applied to the transmission/reception method between the terminal and the eNB during random access in which the terminal performs initial access, and if the terminal has entered the connected state at least one time, even though the terminal performs the state transition to the idle state, the flexible scheduling is applied to the transmission/reception method between the terminal and the eNB during random access. In this case, with respect to the terminal which has entered the connected state at least one time, the eNB keeps UE capability information which the eNB secured for the corresponding terminal even though the terminal has performed the state transition to the idle state.

FIG. 9 illustrates a transmission/reception device of the terminal according to the disclosure. For convenience of description, a device which is not directly relevant to the disclosure is not illustrated nor described.

Referring to FIG. 9, the terminal includes a transmitter 930 including an uplink transmission processing block 900, a multiplexer 910, a transmission RF block 920, a receiver 970 including a downlink reception processing block 940, a demultiplexer 950, and a reception RF block 960, and a controller 980. The controller 980 determines whether the terminal has successfully completed the random access procedure and the terminal state (idle state or connected state) and controls element blocks of the receiver 970 for receiving downlink signals by the terminal and element blocks of the transmitter 930 for transmitting uplink signals. The controller 980 of the terminal may include at least one processor.

In the transmitter 930 of the terminal, the uplink transmission processing block 900 performs a process such as channel coding and modulation and generates a signal to be transmitted. The signal generated by the uplink transmission processing block 900 is multiplexed with another uplink signal by the multiplexer 910, signal-processed by the transmission RF block 920, and then transmitted to the eNB.

The receiver 970 of the terminal demultiplexes the signals received from the eNB and distributes the same to each downlink reception processing block. The downlink reception processing block 940 performs a process such as demodulation and channel decoding for a downlink signal of the eNB and acquires control information or data transmitted by the eNB. The receiver 970 of the terminal applies an output result of the downlink reception processing block to the controller 980 and supports the operation of the controller 980.

Although not illustrated, the eNB may include a controller and a transceiver in the disclosure. The controller of the eNB may include at least one processor. The transceiver of the eNB may transmit and/or receive signals. The controller of the eNB may control the eNB to perform each operation of the eNB described in the embodiments of the disclosure.

Second Embodiment

A wireless communication system has developed to be a broadband wireless communication system that provides a high speed and high quality packet data service, like the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), and 802.16e of IEEE, or the like, beyond the voice-based service provided at the initial stage. As a $5^{th}$ generation wireless communication system, a communication standard of 5G or new radio (NR) (hereinafter, a 5G communication system is interchangeable with an NR system) has been made. Hereinafter, for description of the disclosure, a method by which the eNB transfers resource allocation information to the terminal in LTE and LTE-A systems and a transmission precoding unit which can be assumed by the terminal will be mentioned.

LTE and LTE-A systems, which are representative examples of the broadband wireless communication system, employ an orthogonal frequency division multiplexing (OFDM) scheme for a downlink (DL), and employs a single carrier frequency division multiple access (SC-FDMA) scheme for an uplink (UL). The uplink is a radio link through which a terminal (user equipment (UE) or mobile station (MS)) transmits data or a control signal to an eNode B (eNB) (or a base station (BS)), and the downlink is a radio link through which the eNB transmits data or a control signal to the terminal. In such a multi-access scheme, time-frequency resources for carrying data or control information are allocated and operated in a manner to prevent overlapping of resources, that is, to establish orthogonality, between users so as to identify data or control information of each user.

FIG. 10 illustrates a basic structure of a time-frequency region which is a radio resource region in which the data or the control information is transmitted in the downlink of the LTE and LTE-A systems.

In FIG. 10, the horizontal axis indicates a time region and the vertical axis indicates a frequency region. A minimum transmission unit in the time region is an OFDM symbol. One slot 1006 consists of $N_{symb}$ OFDM symbols 1002 and one subframe 1005 consists of 2 slots. The length of the slot is 0.5 ms, and the length of the subframe is 1.0 ms. A radio frame 1104 is a time region interval consisting of 10 subframes. A minimum transmission unit in the frequency region is a subcarrier, and the bandwidth of an entire system transmission band consists of a total of $N_{BW}$ subcarriers 1004.

A basic unit of resources in the time-frequency region is a resource element (RE) 1012 and may be indicated by an OFDM symbol index and a subcarrier index. A resource block (RB or physical resource block (PRB)) 1008 is defined by $N_{symb}$ successive OFDM symbols 1002 in the time region and $N_{RB}$ successive subcarriers 1010 in the frequency region. Therefore, one RB 1008 consists of $N_{symb} \times N_R B$ REs 1012. In general, a minimum transmission unit of data is the RB unit. In the LTE system, in general, $N_{symb}=7$, $N_{RB}=12$, and $N_{BW}$ is proportional to the bandwidth of the system transmission band. A data transmission rate increases in proportion to the number of RBs scheduled to the terminal.

The LTE system defines and operates 6 transmission bandwidths. In the case of a frequency division duplex (FDD) system, in which the downlink and the uplink are divided by the frequency, a downlink transmission bandwidth and an uplink transmission bandwidth may be different from each other. A channel bandwidth may indicate an RF bandwidth corresponding to the system transmission bandwidth. [Table 1] shows the correspondence relationship between the system transmission bandwidth and the channel bandwidth defined in the LTE system. For example, when the LTE system has a channel bandwidth of 10 MHz, the transmission bandwidth consists of 50 RBs.

TABLE 1

| Channel Bandwidth $BW_{channel}$ [MHz] | 1.4 | 3 | 5 | 10 | 15 | 20 |
|---|---|---|---|---|---|---|
| Transmission bandwidth Configuration $N_{RB}$ | 6 | 15 | 25 | 50 | 75 | 100 |

Downlink control information is transmitted within first N OFDM symbols in the subframe. In general, N={1, 2, 3}. Accordingly, the N varies in every subframe depending on an amount of control information which should be transmitted in the current subframe. The control information includes a control channel transmission interval indicator indicating how many OFDM symbols are used for transmitting the control information, scheduling information of downlink data or uplink data, and HARQ ACK/NACK (acknowledgement/non-acknowledgement) signals.

In the LTE system, the scheduling information of downlink data or uplink data is transmitted from the eNB to the terminal through downlink control information (DCI). The DCI is defined in various formats. The determined DCI format is applied and operated according to whether the DCI is scheduling information (UL grant) for uplink data or scheduling information (DL grant) for downlink data, whether the DCI is compact DCI having small size control information, whether the DCI applies spatial multiplexing using multiple antennas, and whether the DCI is DCI for controlling power. For example, DCI format 1 indicating scheduling control information (DL grant) for downlink data is configured to include at least one piece of the following control information.

Resource allocation type 0/1 flag: notifies whether a resource allocation type is type 0 or type 1. Type 0 applies a bitmap scheme and allocates resources in units of resource block groups (RBGs). In the LTE system, a basic scheduling unit is a resource block (RB) expressed by time and frequency region resources, and an RBG consists of a plurality of RBs and is a basic scheduling unit in the type 0 scheme. Type 1 allows allocation of a particular RB in an RBG.

Resource block assignment: notifies of RBs allocated to data transmission. Expressed resources are determined according to the system bandwidth and the resource allocation type.

Modulation and coding scheme (MCS): indicates a modulation scheme used for data transmission and the size of a transport block (TB) which is data to be transmitted.

HARQ process number: indicates a process number of HARQ.

New data indicator: indicates HARQ initial transmission or HARQ retransmission.

Redundancy version: indicates a redundancy version of HARQ.

Transmit power control (TPC) command for physical uplink control channel (PUCCH): indicates a transmission power control command for a PUCCH, which is a physical uplink control channel.

The DCI is transmitted through a physical downlink control channel (PDCCH) (or control information, hereinafter, the PDCCH is interchangeable with the control information) or an enhanced PDCCH (EPDCCH) (or enhanced control information, hereinafter, the EPDCCH is interchangeable with the enhanced control information) via a channel coding and modulation process.

In general, the DCI is scrambled with a particular radio network temporary identifier (RNTI) (or a terminal identifier), independently for each terminal, a cyclic redundancy check (CRC) is added thereto, and channel coding is performed, whereby each independent PDCCH is configured and transmitted. In the time region, the PDCCH is mapped and transmitted during the control channel transmission interval. The mapping location of the PDCCH in the frequency region is determined by an identifier (ID) of each terminal and distributed to the entire system transmission bandwidth.

Downlink data is transmitted through a physical downlink shared channel (PDSCH) which is a physical downlink data channel. The PDSCH is transmitted after the control channel transmission interval, and the detailed mapping location in the frequency region and scheduling information such as the modulation scheme are notified through DCI transmitted through the PDCCH.

Through the MCS of 5 bits in the control information included in the DCI, the eNB notifies the terminal of a modulation scheme applied to the PDSCH to be transmitted to the terminal and the size of data (transport block size (TBS)) to be transmitted. The TBS corresponds to the size before channel coding for error correction is applied to the data (TB) to be transmitted by the eNB.

The modulation scheme supported by the LTE system includes quadrature phase shift keying (QPSK), 16 quadrature amplitude modulation (16 QAM), and 64 QAM, and modulation orders (Qm) thereof correspond to 2, 4, and 6 respectively. That is, the eNB may transmit 2 bits per symbol in the QPSK modulation, 4 bits per symbol in the 16 QAM, and 6 bits per symbol in the 64 QAM.

FIG. 11 illustrates a basic structure of the time-frequency region which is the radio resource region in which data or control information is transmitted in the uplink of the LTE and LTE-A systems according to the prior arts.

Referring to FIG. 11, the horizontal axis indicates the time region and the vertical axis indicates the frequency region. A minimum transmission unit in the time region is an SC-FDM system 1102 and one slot 1106 consists of $N_{symb}$ SC-FDMA symbols. One subframe 1105 consists of two slots. A minimum transmission unit in the frequency region is a subcarrier and an entire system transmission band (transmission bandwidth) 1104 consists of a total of $N_{BW}$ subcarriers. $N_{BW}$ has a value proportional to the system transmission band.

A basic unit of resources in the time-frequency region is a resource element (RE) 1112 and may be defined by an SC-FDMA symbol index and a subcarrier index. A resource block (RB) 1108 is defined by $N_{symb}$ successive SC-FDMA symbols in the time region and $N_{BW}$ successive subcarriers in the frequency region. Therefore, one RB consists of $N_{symb} \times N_{RB}$ REs. In general, a minimum transmission unit of data or control information is an RB unit. A PUCCH is mapped to the frequency region corresponding to 1 RB and transmitted during one subframe.

More specifically, downlink resource allocation types for conventional LTE and LTE-A UEs includes type 0, type 1, and type 2. Type 0 is a method of defining a resource block group (RBG) and transmitting a bitmap indicating an RBG allocated to the terminal. The RBG is a set of successive virtual resource blocks (VRBs) and the VRB is defined in a localized manner in type 0, which may be used as the same meaning as the physical resource block (PRB). The size of the RBG used in type 0 corresponds to the number of RBs included in one RBG and is defined as follows.

TABLE 2

| System Bandwidth $N_{RB}^{DL}$ | RBG size (P) |
| --- | --- |
| ≤10 | 1 |
| 11-26 | 2 |
| 27-63 | 3 |
| 64-100 | 4 |

In downlink resource allocation type 1, P RBG subsets are defined, one of the RBG subsets is informed to the terminal, and VRBs allocated to the terminal in the one RBG subset are notified through a bitmap. The one RBG consists of P successive VRBs. When p is $OD_p < P$, a $p^{th}$ RBG subset includes every $p^{th}$ RBG from the $p^{th}$ RBG. In type 1, the VRB is defined in a localized manner, which may be used as the same meaning as the PRB. Further, another 1 bit is used to inform of allocation of resources obtained by shifting a bitmap such that the bitmap indicates the last VRB in the RBG subset. ($\log_2(P)$) bits are used to inform the terminal of the RBG subset and 1 bit is used to indicate the shift. Further, the number of bits for the bitmap is defined as $N_{RB}^{TYPE1} = \lceil N_{RB}^{DL}/P \rceil - (\log_2(P)) - 1$.

When successive VRBs are allocated in downlink resource allocation type 2, a resource indication value (RIV) indicating information on a start location ($RB_{start}$) of the allocated VRBs and the number ($L_{CRBs}$) of allocated VRBs is provided. The RIV is defined as $RIV = N_{RB}^{DL}(L_{CRBs}-1) + RB_{start}$ in the case of $(L_{CRBs}-1) \leq \lfloor N_{RB}^{DL}/2 \rfloor$ and defined as $RIV = N_{RB}^{DL}(N_{RB}^{DL} - L_{CRBs} + 1) + (N_{RB}^{DL} - 1 - RB_{start})$ otherwise. The VRBs may be mapped to the PRBs in a localized or a distributed manner. DCI format 1 of the PDCCH includes an RIV indicating information on a start location of VRB groups in $N_{RB}^{step}$ units in which VRBs are grouped in units of $N_{RB}^{step}$ and the number of VRB groups in $N_{RB}^{step}$ units. $N_{RB}^{step}$ according to the system frequency band is defined as follows.

TABLE 3

| System BW $N_{RB}^{DL}$ | $N_{RB}^{step}$ DCI format 1C |
| --- | --- |
| 6-49 | 2 |
| 50-100 | 4 |

Uplink resource allocation types for the conventional LTE and LTE-A UEs include type 0 and type 1. When successive VRBs are allocated in uplink resource allocation type 0, a resource indication value (RIV) indicating information on a start location ($RB_{start}$) of the allocated VRB and the number ($L_{CRBs}$) of allocated VRBs is provided. The RIV is defined as $RIV = N_{RB}^{UL}(L_{CRBs}-1) + RB_{start}$ in the case of $(L_{CRBs}-1) \leq \lfloor N_{RB}^{UL}/2 \rfloor$ and defined as $RIV = N_{RB}^{UL}(N_{RB}^{UL} - L_{CRBs} + 1) + (N_{RB}^{UL} - 1 - RB_{start})$ otherwise.

Uplink resource allocation type 1 informs the terminal of information on two sets of resource blocks, and each set consists of one or more RBGs, the RBG has the size of P, and P is defined as shown in [Table 2] above. The number of bits used for resource allocation is determined as $$\left\lceil \log_2\left( \binom{\lceil N_{RB}^{UL}/P + 1 \rceil}{4} \right) \right\rceil \text{bits}.$$

Information r transmitted for resource allocation is determined as $$r = \sum_{i=0}^{M-1} \binom{N - s_i}{M - i},$$

and M and N are defined as M=4 and $N = (N_{RB}^{UL}/P) + 1$. $s_0$ and $s_1 - 1$ are start and last RBG indexes of a first resource block allocated to the terminal, and $S_2$ and $S_3 - 1$ are start and last RBG indexes of a second resource block allocated to the terminal.

Subsequently, a transmission precoding unit which the conventional LTE and LTE-A terminal can assume is determined by the size of a precoding resource block (precoding resource block group (PRG)). The corresponding PRG unit has the different size depending on a system bandwidth set to the terminal and is defined as follows.

TABLE 4

| System Bandwidth $N_{RB}^{DL}$ | PRB size P' (PRBs) |
|---|---|
| ≤10 | 1 |
| 11-26 | 2 |
| 27-63 | 3 |
| 64-110 | 2 |

Specifically, when a precoding matrix indicator/rank indicator (PMI/RI) report is not configured, the terminal performs decoding under assumption that a demodulation reference signal (DMRS) corresponding to a corresponding reference signal always uses the same precoding only in one RB. When the PMI/RI report is configured, the terminal determines to use the same precoding in one PRG. More specifically, in estimating a channel for data decoding using the DMRS, the terminal estimates the channel within the PRG which is a corresponding bundling unit using PRB bundling linked to the system band. In the LTE system, a plurality of channel state information processes (CSI processes) can be configured in transmission mode 10 (TM10), so that it is assumed that the same precoding is used within one PRG when a PMI/RI report is configured for all CSI processes. Otherwise, it is assumed that the same precoding is always used only within one RB.

The 5G communication system which is a future communication system after LTE supports various numerologies and also considers using a channel bandwidth up to 100 MHz. However, there is a limitation on increasing the number of DCI bits for resource allocation, so a method of determining the RBG size to solve the problem is proposed. In the NR system, slot structures become various, and the NR system supports various and uses a DMRS even in the control channel. Accordingly, it is required to increase the PRG size and improve channel estimation performance through PRB bundling. Further, the NR system is required to consider various PRG sizes. Accordingly, the disclosure proposes a method of allocating resources to increased channel bandwidths and a method of configuring the RBG size. Further, the disclosure proposes a method of configuring the PRG size according to the slot structure and various DMRS patterns of the control channel and the data channel.

Hereinafter, an embodiment of the disclosure will be described in detail with reference to the accompanying drawings. Although embodiments of the disclosure are described as examples of the LTE or LTE-A system, the embodiments of the disclosure may be also applied to other communication systems having a similar technical background or channel form. For example, 5 generation mobile communication technology (5G, new radio (NR)) developed after LTE-A may be included therein. Accordingly, embodiments of the disclosure may be modified without departing from the scope of the disclosure, and may be applied to other communication systems on the basis of a determination by those skilled in the art.

In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made on the basis of the contents throughout the specification. Hereinafter, the eNB is the entity that allocates resources to the terminal and may be one of an eNode B, a Node B, a base station (BS), a radio access unit, an eNB controller, and a node on a network. The terminal may include a user equipment (UE), a mobile station (MS), a cellular phone, a smart phone, a computer, and a multimedia system capable of performing a communication function. In the disclosure, a downlink (DL) refers to a wireless transmission path of a signal that the eNB transmits to the terminal, and an uplink (UL) refers to a wireless transmission path of a signal that the terminal transmits to the eNB.

Embodiments 2-1 and 2-2 of disclosure described below propose a method of configuring the RBG size for an increased channel bandwidth in the 5G system and allocating resources. Embodiment 2-3 of the disclosure proposes a method of configuring the PRG size and bundling PRBs according to various DMRS patterns of a slot structure, a control channel, and a data channel. Further, embodiment 2-4 of the disclosure describes the operations of the eNB and the terminal for the proposed RBG and PRG size in detail.

Embodiment 2-1

Embodiment 2-1 describes a method of configuring the RBG size for an increased channel bandwidth proposed by the disclosure. As described above, the 5G communication system supports various numerologies and also considers a channel bandwidth up to 100 MHz. For example, [Table 5] below shows various subcarrier spacings according to a numerology supported by the NR communication system and a downlink system transmission bandwidth $N_{RB}^{DL}$ according to a downlink channel bandwidth.

TABLE 5

| Channel bandwidth (MHz) | Subcarrier Spacing (KHz) | | | | |
|---|---|---|---|---|---|
| | 15 | 30 | 60 | 120 | 240 |
| 1.4 | 6 | 3 | 2 | NA | NA |
| 3 | 15 | 7 | 3 | 1 | NA |
| 5 | 25 | 12 | 6 | 3 | 1 |
| 10 | 50 | 25 | 12 | 6 | 3 |
| 15 | 75 | 37 | 18 | 9 | 4 |
| 20 | 100 | 50 | 25 | 12 | 6 |
| 40 | 200 | 100 | 50 | 25 | 12 |
| 80 | 400 | 200 | 100 | 50 | 25 |
| 100 | 500 | 250 | 125 | 62 | 31 |

In [Table 5] above, it is assumed that one RB consists of 12 subcarriers. NA indicates that there is no RB which can be transmitted. As described in [Table 2] above, the system transmission bandwidth $N_{RB}^{DL}$ is defined up to 110 RBs in the current LTE system. However, as shown in [Table 5], a system bandwidth of a maximum of 500 RBs may be considered when the NR communication system is considered. The case in which the subcarrier spacing is 15 kHz and the channel bandwidth is 40, 80, or 100 MHz, the case in which the subcarrier spacing is 30 kHz and the channel bandwidth is 80 or 100 MHz, and the case in which the subcarrier spacing is 60 kHz and the channel bandwidth is 100 MHz in [Table 5] correspond to system transmission bandwidths which have not been defined in the current LTE system.

When the eNB flexibly transmits resource allocation information of the increased system bandwidth, the number of necessary DCI bits may increase. For example, as shown in [Table 2] above, when it is assumed that a maximum RBG size is 4 RBGs, the number of necessary DCI bits for 500 RBs is 125 bits. The increased number of DCI bits lowers the transmission coverage of the control channel, so that the number of DCI bits cannot be increased according to the increased bandwidth. Accordingly, the disclosure proposes a method of configuring the RBG size for the increased channel bandwidth.

Similar to the current LTE system, the RBG size may be configured as the RBG size having a predetermined value according to the system bandwidth. The method of determining the RBG size for the increased channel bandwidth according to the system band is shown in [Table 6] below.

TABLE 6

| System Bandwidth $N_{RB}^{DL}$ | RBG size (P) |
|---|---|
| ≤R1 | a |
| R2-R2' | b |
| R3-R3' | c |
| R4-R4' | d |
| R5-R5' | e |
| R6-R6' | f |
| R7-R7' | g |

For example, when the slot defined in the NR system consists of 14 symbols, valid RBG configuration values of [Table 6] to maintain the number of DCI bits as a maximum of 25 bits may be determined as shown in [Table 7] below.

TABLE 7

| System Bandwidth $N_{RB}^{DL}$ | RBG size (P) |
|---|---|
| ≤10 | 1 |
| 11-26 | 2 |
| 27-63 | 3 |
| 64-110 | 4 |
| 111-200 | 8 |
| 201-400 | 16 |
| 401-500 | 20 |

In another example, when the slot defined in the NR system consists of 7 symbols or a mini slot is used, it is required to increase the resource allocation unit, so that valid RBG configuration values of [Table 6] may be determined to be larger than those in [Table 7] as shown in [Table 8] below.

TABLE 8

| System Bandwidth $N_{RB}^{DL}$ | RBG size (P) |
|---|---|
| ≤10 | 2 |
| 11-26 | 4 |
| 27-63 | 6 |
| 64-200 | 8 |
| 201-400 | 16 |
| 401-500 | 20 |

Accordingly, in the method of configuring the RBG, the RBG size having a predetermined value may vary depending on the system bandwidth according to the slot structure considered in the NR system. For example, when the slot consists of 14 or 7 symbols, the RBG is determined with reference to [Table 7]. In the structure of a mini slot consisting of smaller symbols, the RBG may be determined with reference to [Table 8]. The RBG size shown in [Table 7] and [Table 8] correspond to a value proposed in consideration of the NR system, but the RBG size is not limited to the values shown in [Table 7] and [Table 8] in the disclosure.

The method of configuring the RBG proposed by the disclosure will be described in more detail with reference to FIG. 12. FIG. 12 illustrates a method of configuring an RBG by the terminal according to the disclosure. First, the terminal may identify information on configured slots in step 1200 and determine the RBG size differently configured according to the slot structure in step 1210. If it is assumed that the slot structure is configured as a first structure, a first RBG configuration is assumed in step 1220. If it is assumed that the slot structure is configured as a second structure, a second RBG configuration is assumed in step 1230. Further, the terminal receives resource allocation information according to the configured RBG size.

Embodiment 2-2

Embodiment 2-2 proposes a method of more effectively allocating resources using the method of configuring the RBG size proposed by embodiment 2-1. As shown in [Table 7] and [Table 8] of embodiment 2-1, the RBG size increases to a maximum of 20 due to the increased channel bandwidth. When the eNB performs resource allocation on the basis of the RBG size of 20, there may be a limitation that resource allocation should be always performed with the large size. Embodiment 2-2 proposes an additional method of configuring the RBG size to solve the problem.

In order to enable resource allocation with a smaller size, an additional bit may be added to DCI. As shown in [Table 2], the maximum size of the RBG in the conventional LTE system is 4. In a method of maintaining the RBG size of resource allocation as 4, a maximum of 5 bits may be added to DCI. Such a method will be described in more detail with reference to FIG. 13.

FIG. 13 illustrates embodiment 2-2. For example, when a system bandwidth of a maximum of 500 RBs is allocated as indicated by reference numeral 1300 of FIG. 13, a first method of maintaining the RBG size as 4 is described below. The resource allocation location of 20 RBs 1302 of 500 RBs is configured using a $|N_{RB}^{DL}/P|=25$-bit map by first applying P of the RBG value proposed by embodiment 2-1. Subsequently, the allocation location of 4 RBs 1304 of 20 RBs allocated additionally using a 5-bit map may be configured. The location of 4 RBs allocated using the 5-bit bitmap is always fixed even when 20 RBs are allocated to another location.

Unlike this, a second method of maintaining the RBG size as 4 when a system bandwidth of a maximum of 500 RBs is allocated is described below. As indicated by reference number 1310 of FIG. 13, the resource allocation location of 100 RBs 1312 of 500 RBs is first configured using a 5-bit bitmap. Subsequently, the allocation location of 4 RBs 1314 of 100 RBs may be configured using a 25-bit bitmap. In the two methods, resource allocation of 4 RBs is possible using a total of 30 bits, and the RBG size may be divided into and defined as the RBG and the sub RBG according to a future application method.

Embodiment 2-3

Embodiment 2-3 proposes a method of configuring the PRG size proposed by the disclosure. As described above, compared to the LTE system, the NR system may support various PRG sizes according to a slot structure and various DMRS patterns of control channels and data channels. Specifically, while the corresponding PRG unit is determined as one size according to the system bandwidth configured in the terminal as shown in [Table 4] in the LTE system, it is required to support various PRG sizes in the 5G communication system. For example, since areas for transmitting data decrease in the mini slot structure compared to the slot, a minimum of DMRS density to guarantee channel estimation performance is needed.

Further, while channel estimation for the control channel is performed using a cell-specific reference signal (CRS) transmitted in the entire band in the LTE system, channel estimation is performed using the DMRS transmitted in the control channel in the NR system. Since areas of the control channel for transmitting control information are also limited compared to areas of the data channel, a minimum of DMRS density to guarantee channel estimation performance is needed.

Further, in the NR system, supporting various DMRS patterns in the data channel has been agreed. Accordingly, channel estimation performance may vary depending on a used DMRS pattern. Therefore, if the size of PRB bundling is increased, it become possible to improve channel estimation performance in the case of small DRMS density on the frequency.

FIG. 14 illustrates examples of various DMRS structures mapped to one OFDM symbol. In the case of small DMRS density on the frequency as indicated by reference numeral 1400, channel estimation performance can be improved when the size of PRB bundling is increased compared to the DMRS structure as indicated by reference numeral 1410 or 1420. Accordingly, unlike the LTE system, the NR system may support various sizes of PRG units depending on the location of the transmitted OFDM symbol. Therefore, the disclosure proposes a method of configuring various. PRG sizes. The method of configuring the PRG size may consider two methods below.

PRG configuration method 1: configures a PRG size having a predetermined value according to a system band.

PRG configuration method 2: eNB configures a PRG size through higher layer signaling (for example, radio resource control (RRC) signaling) or dynamic signaling (downlink control information (DCI), and MAC control element (CE)).

Similar to the current LTE system, PRG configuration method 1 is a method of configuring the PRG size having a predetermined value according to a system band. A method of determining the RBG size of an increased channel bandwidth according to a system band is shown in [Table 9] below.

TABLE 9

| System Bandwidth $N_{RB}^{DL}$ | PRB Size P' (PRBs) |
|---|---|
| ≤R1 | a |
| R2-R2' | b |
| R3-R3' | c |
| R4-R4' | d |

For example, in the NR system, a minimum PRB configuration value valid according to a system band may be determined as shown in [Table 10] below.

TABLE 10

| System Bandwidth $N_{RB}^{DL}$ | PRB Size P' (PRBs) |
|---|---|
| ≤10 | 1 |
| 11-26 | 2 |
| 27-63 | 3 |
| 64-500 | 2 |

In another example, in the NR system, when there is a need to improve channel estimation performance through an increase in the PRB size, a valid PRB configuration value may be determined to be larger than that in [Table 10] as shown in [Table 11].

TABLE 11

| System Bandwidth $N_{RB}^{DL}$ | PRB Size P' (PRBs) |
|---|---|
| ≤10 | 2 |
| 11-26 | 4 |
| 27-63 | 3 |
| 64-500 | 4 |

Accordingly, in the case of PRG configuration method 1, the PRG size can be configured according to the system band and different PRG sizes can be configured according to the slot structure, the applied channel, or the applied DMRS structure as described above. For example, this may indicate whether [Table 10] or [Table 11k] is used by adding one bit to DCI. The PRG sizes shown in [Table 10] and [Table 11] are values proposed in consideration of the NR system and performance of PRB bundling, but the PRG sizes are not limited to the values shown in [Table 10] and [Table 11] in the disclosure.

However, the PRB size can be indirectly indicated without introduction of additional signaling. A method of indirectly indicating the PRG size will be described in more detail with reference to FIGS. 15 to 17.

FIG. 15 illustrates a first method of indirectly indicating the PRG size according to embodiment 2-3. For example, the slot structure may be divided into a slot and a mini slot. A method of indirectly indicating the PRG size according to the slot structure is illustrated in FIG. 15. The terminal may identify configured slot information in step 1500 and determine PRG sizes differently configured according to the slot structure in step 1510. If it is assumed that the slot structure is configured as a first structure, the terminal assumes a first PRG configuration in step 1520. If it is assumed that the slot structure is configured as a second structure, a second PRG configuration is assumed in step 1530.

FIG. 16 illustrates a second method of indirectly indicating the PRG size according to embodiment 2-3. A method of indirectly indicating the PRG size according to a channel type is illustrated in FIG. 16. The terminal may identify corresponding channel information in step 1600 and determine PRG sizes differently configured according to the channel type in step 1610. If it is assumed that the channel type is configured as a first channel, the terminal assumes a first PRG configuration in step 1620. If it is assumed that the channel type is configured as a second channel, a second PRG configuration is assumed in step 1630. For example, the channel type may be divided into a data channel and a control channel.

FIG. 17 illustrates a third method of indirectly indicating the PRG size according to embodiment 2-3. A method of indirectly indicating the PRG size according to a DMRS structure is illustrated in FIG. 17. The terminal may identify configured DMRS configuration information in step 1700 and determine PRG sizes differently configured according to the DMRS structure in step 1710. If it is assumed that the DMRS structure is configured as a first structure, the terminal assumes a first PRG configuration in step 1720. If it is assumed that the DMRS structure is configured as a second structure, a second PRG configuration is assumed in step 1730. For example, the DMRS structure may be divided into structures having different DMRS densities as illustrated in FIG. 14. Further, in FIG. 17, the term for the DMRS structure may be replaced with another term having a similar function for analysis such as a DMRS pattern, a DMRS port, or a DMRS configuration.

In addition, the methods of embodiment 2-3 may be used together.

Next, PRG configuration method 2 is a method of constructing a set of PRG sizes which can be configured and configuring the PRG size through higher layer signaling (RRC signaling) or dynamic signaling (DCI or MAC CE) by the eNB unlike PRG configuration method 1. Unlike method 1 of indirectly indicating the PRG configuration, the method directly configures the PRG, so that signaling overhead may be generated but there is an advantage of flexible determination of the PRF size according to determination of the eNB. For example, a set of PRG sizes which can be configured in consideration of the bandwidth and the PRG size considered in the NR system may be configured as shown in [Equation 1] below.

$$PRG\_set=\{1, 2, 3, 4, All\} \qquad [Equation\ 1]$$

In [Equation 1], PRG size=1 means that the same precoding is used only in one RB without PRB bundling and PRG size=All means that PRB bundling is configured in the system band or the entire band configured in or allocated to the terminal (that is, the same precoding is applied to the entire band or the entire band configured in or allocated to the terminal). In order to allow the eNB to indicate the PRG included in [Equation 1] to the terminal through dynamic signaling, 3-bit information may be used as shown in [Table 12].

TABLE 12

| Bit indication | PRB size P' (PRBs) |
|---|---|
| 000 | 1 |
| 001 | 2 |
| 010 | 3 |
| 011 | 4 |
| 100 | reserved |
| 101 | reserved |
| 110 | reserved |
| 111 | All |

In [Table 12] above, reserved may be used for configuring a larger PRG. For example, PRG size=6, 8, 10 may be added.

Subsequently, a method using all of higher layer signal (RRC) or dynamic signal (DCI, MAC CE, or the like) may be considered. As shown in [Table 12], when the PRG size is indicated using only the dynamic signaling, a problem of dynamic signaling overhead may occur. In order to redeem this, higher layer signaling may be used. First, when PRB bundling ON/OFF signaling is configured in a higher layer, [Equation 1] used for dynamic signaling may be modified to the following equation.

$$PRG\_set=\{2, 3, 4, All\} \qquad [Equation\ 2]$$

Similar to [Equation 1], PRG size=All in [Equation 2] configures PRG bundling in the system band or the entire band configured in or allocated to the terminal. As described above, when ON/OFF of PRB bundling is configured through higher layer signaling, the eNB may use 2-bit information shown in [Table 13] below in order to indicate the PRGs included in [Equation 2] to the terminal through dynamic signaling.

TABLE 13

| Bit indication | PRB Size P'(PRBs) |
|---|---|
| 00 | 2 |
| 01 | 3 |
| 10 | 4 |
| 11 | All |

When the PRG size is indicated by only 1 bit dynamic signaling, a plurality of PRG size sets (PRG_set) may be defined in a higher layer and selection therefor may be signaled in a second method. For example, as described below, a plurality of PRG size sets (PRG_set) including two PRGs may be configured in the higher layer.

$$PRG\_set1=\{1, All\},\ PRG\_set1=\{2, 4\},\\ PRG\_set1=\{3, 6\} \qquad [Equation\ 3c]$$

As described above, when the plurality of PRG_set is configured and selection for a PRG size set to be used is signaled through the higher layer, the eNB can select one of the two PRGs of the PRG_set and indicate the same to the terminal through 1 bit dynamic signaling as shown in [Table 14] below.

TABLE 14

| Bit indication | PRB Size P' (PRBs) |
|---|---|
| 0 | PRB size 1 indicated by upper layer |
| 1 | PRB size 2 indicated by upper layer |

Embodiment 2-4

Embodiment 2-4 illustrates the operations of the eNB and the terminal for the method of configuring the RBG and the PRG proposed by the embodiment in more detail with reference to FIGS. 18 and 19. FIG. 18 illustrates the operations of the eNB and the terminal when the RBG size is configured. In step 1800 of FIG. 18, the eNB transmits resource allocation information to the terminal according to the RBG size configured to resource allocation as described in embodiments 2-1 and 2-2. In embodiment 2-1, $\lceil N_{RB}^{DL}/P \rceil$ bits may be added to the DCI according to a resource allocation method. Further, when embodiment 2-2 is applied, additional bits are used and thus the number of bits larger than $\lceil N_{RB}^{DL}/P \rceil$ may be added to the DCI. Subsequently, the terminal receives resource allocation information in step 1810. Last, in step 1820, the terminal may analyze resource allocation information and perform the operation (resource deallocation) for identifying resources to which data is mapped according thereto.

Next, FIG. 19 illustrates the operations of the eNB and the terminal when the PRG size is configured. In step 1900 of FIG. 19, the eNB directly or indirectly transmits information on the PRG size to the terminal as present by embodiment 2-2. Subsequently, in step 1910, the terminal receives information on the PRG size. Last, in step 1920, when estimating a channel for data decoding using a reference signal, the terminal estimates the channel within a PRG which is a corresponding bundling unit using RPB bundling linked to the system band.

In order to perform the above-described embodiments of the disclosure, a transmitter, a receiver, and a processor of each of the terminal and the eNB are illustrated in FIGS. 20 and 21. The transmission/reception method between the eNB and the terminal to perform the operations of the eNB and the terminal according to the configuration of the RBG and PRG size has been described in embodiment 2-1 to embodiment 2-4, and each of the receivers, the processors, and the transmitters of the eNB and the terminal should operate according to each embodiment in order to perform the transmission/reception method.

Specifically, FIG. 20 is a block diagram illustrating an internal structure of a terminal according to an embodiment of the disclosure. As illustrated in FIG. 20, the terminal according to the disclosure may include a terminal receiver 2010, a terminal transmitter 2020, and a terminal processor 2000. The terminal processor 2000 may be named a controller. The terminal processor 2000 may include at least one processor. The terminal receiver 2010 and the terminal transmitter 2020 may be collectively referred to as a transceiver in embodiments of the disclosure. The transceiver may transmit and receive a signal to/from the eNB. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver outputs, to the terminal processor 2000, a signal received via a radio channel, and transmits a signal output from the terminal processor 2000 via a radio channel. The terminal processor 2000 may control a series of processes such that the terminal operates according to the disclosure.

FIG. 21 is a block diagram illustrating an internal structure of an eNB according to an embodiment of the disclosure. As illustrated in FIG. 21, the eNB according to the disclosure may include an eNB receiver 2110, an eNB transmitter 2120, and an eNB processor 2100. The eNB processor 2100 may be named a controller. The eNB processor 2100 may include at least one processor. The eNB receiver 2110 and the eNB transmitter 2120 are collectively referred to as a transceiver in embodiments of the disclosure. The transceiver may transmit and receive a signal to/from the terminal. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver may receive a signal received through a radio channel, output the signal to the eNB processor 2100, and transmit the signal output from the eNB processor 2100 through a radio channel. The eNB processor 2100 may control a series of processes such that the eNB operates according to the above-described embodiments of the disclosure.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the present invention. Further, if necessary, the above respective embodiments may be employed in combination.

The invention claimed is:

1. A method by a terminal in a communication system, the method comprising:
    transmitting a random access preamble to a base station for performing a random access procedure;
    receiving a random access response message from the base station based on a longest slot length among slot lengths applicable between the terminal and the base station in case that the random access procedure is an initial access;
    transmitting a message 3 to the base station;
    receiving, from the base station, scheduling information for scheduling a message 4 corresponding to the message 3 and indicating a slot length associated with the message 4;
    receiving the message 4 from the base station, based on the slot length indicated by the scheduling information; and
    transmitting control information indicating whether the message 4 is received from the base station,
    wherein the random access response message is received according to a slot length based on capability information of the terminal, in case that the random access procedure is not the initial access.

2. The method of claim 1, wherein the message 3 is transmitted based on the longest slot length.

3. The method of claim 1, wherein the control information is transmitted to a physical uplink control channel (PUCCH) of a long format.

4. A method by a base station in a communication system, the method comprising:
    receiving a random access preamble from a terminal for performing a random access procedure;
    transmitting a random access response message to the terminal based on a longest slot length among slot lengths applicable between the terminal and the base station in case that the random access procedure is an initial access;
    receiving a message 3 from the terminal;
    transmitting, to the terminal, scheduling information for scheduling a message 4 corresponding to the message 3 and indicating a slot length associated with the message 4;
    transmitting the message 4 to the terminal, based on the slot length indicated by the scheduling information; and
    receiving, from the terminal, control information indicating whether the message 4 is received,
    wherein the random access response message is transmitted according to a slot length based on capability information of the terminal, in case that the random access procedure is not the initial access.

5. The method of claim 4, wherein the message 3 is received based on the longest slot length.

6. The method of claim 4, wherein the control information is received on a physical uplink control channel (PUCCH) of a long format.

7. A terminal in a communication system, the terminal comprising:
    a transceiver; and
    a controller connected to the transceiver to perform control to transmit a random access preamble to a base station for performing a random access procedure, receive a random access response message from the base station based on a longest slot length among slot lengths applicable between the terminal and the base station in case that the random access procedure is an initial access, transmit a message 3 to the base station, receive, from the base station, scheduling information for scheduling a message 4 corresponding to the message 3 and indicating a slot length associated with the message 4, receive the message 4 from the base station, based on the slot length indicated by the scheduling information, and transmit control information indicating whether the message 4 is received from the base station, wherein the random access response message is received according to a slot length based on capability information of the terminal, in case that the random access procedure is not the initial access.

8. The terminal of claim 7, wherein the message 3 is transmitted based on the longest slot length.

9. The terminal of claim 7, wherein the control information is transmitted to a physical uplink control channel (PUCCH) of a long format.

10. A base station in a communication system, the base station comprising:
a transceiver; and
a controller connected to the transceiver to perform control to receive a random access preamble from a terminal for performing a random access procedure, transmit a random access response message to the terminal based on a longest slot length among slot lengths applicable between the terminal and the base station in case that the random access procedure is an initial access, receive a message 3 from the terminal, transmit, to the terminal, scheduling information for scheduling a message 4 corresponding to the message 3 and indicating a slot length associated with the message 4, transmit the message 4 to the terminal, based on the slot length indicated by the scheduling information, and receive, from the terminal, control information indicating whether the message 4 is received,
wherein the random access response message is transmitted according to a slot length based on capability information of the terminal, in case that the random access procedure is not the initial access.

11. The base station of claim 10, wherein the message 3 is received based on the longest slot length.

12. The base station of claim 10, wherein the control information is received on a physical uplink control channel (PUCCH) of a long format.

* * * * *